(12) United States Patent
Kaube et al.

(10) Patent No.: US 11,005,851 B2
(45) Date of Patent: May 11, 2021

(54) RETRIEVING DIGITAL CONTENT OVER A NETWORK

(71) Applicant: CAMELOT UK BIDCO LIMITED, London (GB)

(72) Inventors: Benjamin Kaube, London (GB); Jan Reichelt, London (GB); Peter Vincent, Petworth (GB); Freddie Witherden, Pitstone (GB)

(73) Assignee: CAMELOT UK BIDCO LIMITED, London (GB)

( * ) Notice: Subject to any disclaimer, the term of this patent is extended or adjusted under 35 U.S.C. 154(b) by 287 days.

(21) Appl. No.: 16/059,858

(22) Filed: Aug. 9, 2018

(65) Prior Publication Data

US 2020/0053094 A1    Feb. 13, 2020

(51) Int. Cl.
  *G06F 21/00* (2013.01)
  *H04L 29/06* (2006.01)
  *G06F 8/71* (2018.01)
  *G06F 21/31* (2013.01)
  (Continued)

(52) U.S. Cl.
  CPC .............. *H04L 63/105* (2013.01); *G06F 8/71* (2013.01); *G06F 16/955* (2019.01); *G06F 21/31* (2013.01); *G06K 9/00483* (2013.01); *H04L 63/0884* (2013.01)

(58) Field of Classification Search
  CPC . H04L 63/105; H04L 63/0884; G06F 16/955; G06F 8/71; G06F 21/31; G06K 9/00483
  See application file for complete search history.

(56) References Cited

U.S. PATENT DOCUMENTS 8,555,157 B1 * 10/2013 Fu .................. G06F 16/972
  715/234
8,819,542 B2 * 8/2014 Cudich .............. G06F 3/0486
  715/243
9,355,132 B1 * 5/2016 Hale .................. G06F 11/3604
(Continued)

OTHER PUBLICATIONS (IEEExplore, https://web.archive.org/web/20140301000000*/https://ieeexplore.ieee.org/Xplore/dynhome.jsp, Mar. 7, 2014, hereinafter IEEExplore).*

(Continued)

*Primary Examiner* — Maung T Lwin
(74) *Attorney, Agent, or Firm* — Oblon, McClelland, Maier & Neustadt, L.L.P.

(57) ABSTRACT

An electronic device includes a user interface, the user interface being communicably coupled to processing circuitry configured to operate a research browser plugin, the research browser plugin, via the processing circuitry, being configured to determine a user's access permissions to a document, the document being stored at network locations in document versions that are categorized by a predetermined hierarchy. Additionally, the research browser plugin is configured to generate, on the user interface, a one-click control and associate the one-click control with a resource locator (e.g., URL) of a selected document version, the selected version being the highest version in the hierarchy to which the user has access permissions, and retrieve the document associated with the resource locator in response to one-click activation of the one-click control.

18 Claims, 15 Drawing Sheets

(51) Int. Cl.
*G06K 9/00* (2006.01)
*G06F 16/955* (2019.01)

(56) References Cited

U.S. PATENT DOCUMENTS

| | | | | |
|---|---|---|---|---|
| 9,684,888 | B2* | 6/2017 | Shraim | H04L 63/1441 |
| 9,727,651 | B1* | 8/2017 | Frazin | G06F 16/248 |
| 9,977,800 | B2* | 5/2018 | Shriber | G06F 16/9535 |
| 10,237,299 | B2* | 3/2019 | Davidson | G06F 16/951 |
| 10,509,861 | B2* | 12/2019 | Rollins | G06F 40/30 |
| 2002/0002567 | A1 | 1/2002 | Kanie et al. | |
| 2004/0064733 | A1* | 4/2004 | Gong | H04L 51/08 |
| | | | | 726/27 |
| 2004/0128347 | A1* | 7/2004 | Mason | H04L 29/06 |
| | | | | 709/203 |
| 2004/0230967 | A1* | 11/2004 | Yuknewicz | G06F 8/71 |
| | | | | 717/170 |
| 2005/0114324 | A1* | 5/2005 | Mayer | G06F 16/951 |
| 2007/0100862 | A1* | 5/2007 | Reddy | G06F 16/958 |
| 2007/0180354 | A1* | 8/2007 | Rivers-Moore | G06F 40/14 |
| | | | | 715/205 |
| 2007/0260648 | A1 | 11/2007 | Friesenhahn et al. | |
| 2009/0307100 | A1* | 12/2009 | Nguyen | G06Q 30/0623 |
| | | | | 705/26.1 |
| 2010/0030752 | A1* | 2/2010 | Goldentouch | G06F 16/81 |
| | | | | 707/797 |
| 2010/0223260 | A1 | 9/2010 | Wu | |
| 2013/0218845 | A1* | 8/2013 | Kleppner | G06F 16/176 |
| | | | | 707/687 |
| 2014/0250243 | A1 | 9/2014 | Keebler et al. | |
| 2014/0279851 | A1 | 9/2014 | Rangarajan et al. | |
| 2014/0344325 | A1* | 11/2014 | Moser | H04L 67/2842 |
| | | | | 709/203 |
| 2015/0310005 | A1* | 10/2015 | Ryger | G06F 16/3334 |
| | | | | 707/706 |
| 2016/0314102 | A1 | 10/2016 | Bezar et al. | |
| 2017/0188552 | A1 | 7/2017 | Zinno | |
| 2017/0200122 | A1* | 7/2017 | Edson | H04L 63/104 |
| 2017/0249393 | A1* | 8/2017 | Nair | G06F 16/25 |
| 2018/0025081 | A1 | 1/2018 | Denninghoff | |
| 2018/0033322 | A1* | 2/2018 | Chilakamarri | G06F 16/951 |
| 2018/0322176 | A1* | 11/2018 | Busayarat | G06F 16/738 |

OTHER PUBLICATIONS (Archive, https://web.archive.org/web/20130901000000*/https://www.whatismyip.com/what-is-a-proxy/, Jul. 3, 2013, hereinafter Archive).*

Bjarnason, et al., "Web Publications", W3C Working Draft, Mar. 15, 2018, "http://www.w3.org/TR/2018/WD-wpub-20180315/".

Keane, Jonathan, "Serial entrepeneurs kickstart Kopernio to tear down the barriers to academic research papers; Academia, Edtech; http://tech.eu/profiles/17871/kopernio-academic-research-papers/", Nov. 20, 2017.

* cited by examiner

RETRIEVING DIGITAL CONTENT OVER A NETWORK

BACKGROUND

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Typical academic researchers access around 250 journal articles in PDF format each year from a range of different publishers, websites, and other online platforms. Journal content is split between "open"/free content which can be accessed freely without the need for subscriptions and paywalled content which is typically licensed by research institutions on behalf of researchers. Some articles exist in both open (often "preprints" or author "manuscripts") and final published versions (also known as "version of record", VoR, or "published journal article", PJA). Preprints, manuscripts, and the like have typically been uploaded by the authors to "repositories", or databases, or their own personal webpages. Versions of record are professionally typeset, have volume, issue, and page numbers based on where they appear in the journal, and are guaranteed to include the corrections from the peer review process and are so preferable to the "open" versions.

Generally, a researcher seeks a document that has been peer reviewed and published in a research journal. However, not all documents are in such peer-reviewed state and in some cases, the researcher may not have the credentials to access such a peer-reviewed article through a publisher's website. In such cases, the researcher may have to settle on a lesser version, e.g., a preprint or author manuscript located at an open content website. Finding the best version, i.e., a VoR over a preprint or manuscript, can consume costly researcher resources and development of systems that can reduce the expenditure of such resources is ongoing.

SUMMARY

According to aspects of the disclosed subject matter, an electronic device includes a user interface, the user interface being communicably coupled to processing circuitry configured to operate a research browser plugin, the research browser plugin, via the processing circuitry, being configured to determine a user's access permissions to a document, the document being stored at network locations in document versions that are categorized by a predetermined hierarchy. Additionally, the research browser plugin is configured to generate, on the user interface, a one-click control and associate the one-click control with a resource locator (e.g., URL) of a selected document version, the selected version being the highest version in the hierarchy to which the user has access permissions, and retrieve the document associated with the resource locator in response to one-click activation of the one-click control.

The foregoing summary has been provided by way of general introduction, and is not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
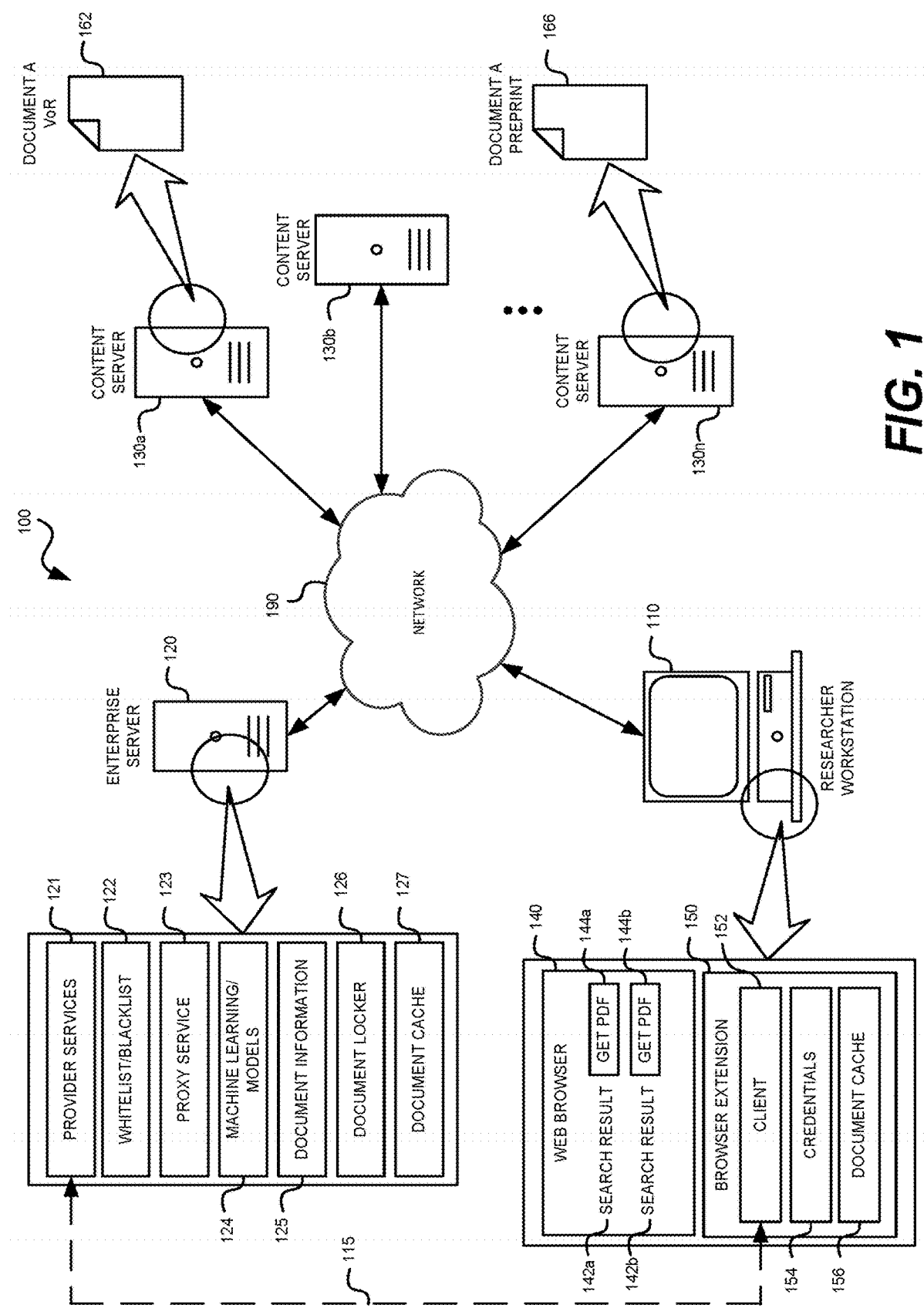
FIG. 1 is a schematic block diagram of an exemplary system in which the present invention can be embodied.

The description set forth below in connection with the appended drawings is intended as a description of various embodiments of the disclosed subject matter and is not necessarily intended to represent the only embodiment(s). In certain instances, the description includes specific details for the purpose of providing an understanding of the disclosed subject matter. However, it will be apparent to those skilled in the art that embodiments may be practiced without these specific details. In some instances, well-known structures and components may be shown in block diagram form in order to avoid obscuring the concepts of the disclosed subject matter.

Reference throughout the specification to "one embodiment" or "an embodiment" means that a particular feature, structure, characteristic, operation, or function described in connection with an embodiment is included in at least one embodiment of the disclosed subject matter. Thus, any appearance of the phrases "in one embodiment" or "in an embodiment" in the specification is not necessarily referring to the same embodiment. Further, the particular features, structures, characteristics, operations, or functions may be combined in any suitable manner in one or more embodiments. Further, it is intended that embodiments of the disclosed subject matter can and do cover modifications and variations of the described embodiments.

It must be noted that, as used in the specification and the appended claims, the singular forms "a," "an," and "the" include plural referents unless the context clearly dictates otherwise. That is, unless clearly specified otherwise, as used herein the words "a" and "an" and the like carry the meaning of "one or more." Additionally, terms such as "first," "second," "third," etc., merely identify one of a number of portions, components, points of reference, operations and/or functions as described herein, and likewise do not necessarily limit embodiments of the disclosed subject matter to any particular configuration or orientation.

Additionally, the word exemplary is used herein to mean, "serving as an example, instance or illustration." Any embodiment of construction, process, design, technique, etc., designated herein as exemplary is not necessarily to be construed as preferred or advantageous over other such embodiments. Particular quality or fitness of the examples indicated herein as exemplary is neither intended nor should be inferred.

Referring now to the drawings, wherein like reference numerals designate identical or corresponding parts throughout the several views.

FIG. 1 is a schematic block diagram of an exemplary system 100 in which the present invention can be embodied. As illustrated in the figure, system 100 comprises a researcher workstation 110 through which a researcher can find and retrieve web resources according to the techniques described herein. In certain embodiments, the web resources of interest are in the form of research papers (e.g., journal articles, research reports, etc.), but the present invention is not so limited. For purposes of description and not limitation, the research papers may be computer files in a known document format, e.g., portable document format (PDF), that can be accessed through suitable network protocol commands, e.g., hypertext transfer protocol (HTTP), and the file's address, e.g., uniform resource locator (URL). It is to be understood that the present invention is not limited to PDF files, HTTP or URL addresses. Upon review of this disclosure, skilled artisans will recognize numerous research frameworks in which the present invention can be embodied without departing from the spirit and intended scope thereof.

Certain embodiments of the invention seek to generate or otherwise produce a reference or link that targets the "best" version of a research paper as rapidly as possible. Herein, the term "best" refers to highest in a hierarchical categorization; a "best version" refers to a document version (e.g., VoR, preprint, etc.) that is highest in a hierarchy of document versions (VoR or PJA) over preprint or manuscript. The single action or one-click technique of present invention embodiments involves building a "smart-link," which, as used herein, replaces the native or manual end-user actions that would be required to get access to web resources. These actions may span numerous online platforms requiring multiple links to be followed, redirects, interstitial pages, completion and submission of forms, user authentications, and the like. These details are performed in the background, hidden from the user and presented as a recognizable single click control (e.g., one-click button).

Workstation 110 may implement, among other things, a web browser 140, through which the researcher can conduct online research, and a browser extension 150, by which browser is adapted to realize aspects of the present invention. As illustrated in the figure, browser extension 150 includes a client component 152 that interoperates with a provider services component 121 on enterprise server 120 over one or more communication links 115 through network 190 to implement the features described herein. Embodiments of the invention may avail themselves of known mechanisms by which a browser is extended (or browser plugin installed), and by which a client component on a computer can communicate with and receive services from a server. Accordingly, unless such is required for an understanding of the inventive concept, implementation details of well-known mechanisms will be omitted in the interest of conciseness.

As illustrated in FIG. 1, browser extension 150 may also include credentials 154 with which a researcher is granted access to resources that require such. Browser extension 150 may also include a document cache 158 in which documents and document information are stored.

Exemplary enterprise server 120 implements centralized, back-end mechanisms of the illustrated embodiment. For example, as indicated above, enterprise server 120 may implement a provider services component 121 that interoperates with client component 152. Further, enterprise server 120 maintains, as indicated at 122, a whitelist of source uniform resource locator (URL) patterns and a blacklist of web resource sources that are to be excluded from access for resources. Enterprise server 120 may further include a proxy service 123 by which a researcher can access articles according to his or her institutional subscriptions. Machine learning techniques and corresponding models, representatively illustrated in FIG. 1 as machine learning/models component 124 may be realized on enterprise server 120 to perform machine learning tasks described herein. Document information 135 is a database of documents and researchers that can be consulted to determine the best route to a particular article given a researcher's credentials. Enterprise server 120 may further include an online document locker 128 in which a researcher may store copies of retrieved documents. A document cache 127 may be provided to increase the speed of resource retrieval and to serve as a lookup database for document information.

As illustrated in FIG. 1, a plurality of content servers 130a-130n, representatively referred to herein as content server(s) 130, may be accessible by embodiments of the invention through network 190. Content servers 130 represent any network-connected device from which web resources can be retrieved using known networking protocols. Certain content servers 130 may implement access restrictions (e.g., a paywall), while other content servers 130 may be freely accessible without a subscription or credentials.

A researcher may interact with system 100 through web browser 140. In doing research, the researcher may enter a query through web browser 140 and in response may receive query results in a conventional manner. In certain embodiments, the results of the query may be presented to the user in browser 140 as a list of resources, representatively illustrated in FIG. 1 at search results 142a and 142b and referred to herein as search result(s) 142. When a search result 142 appears to be an article link, which may be determined from the URL pattern returned in the search, client component 152 may request information about this document from enterprise server 120, specifically from document information 125.

Figure 3:
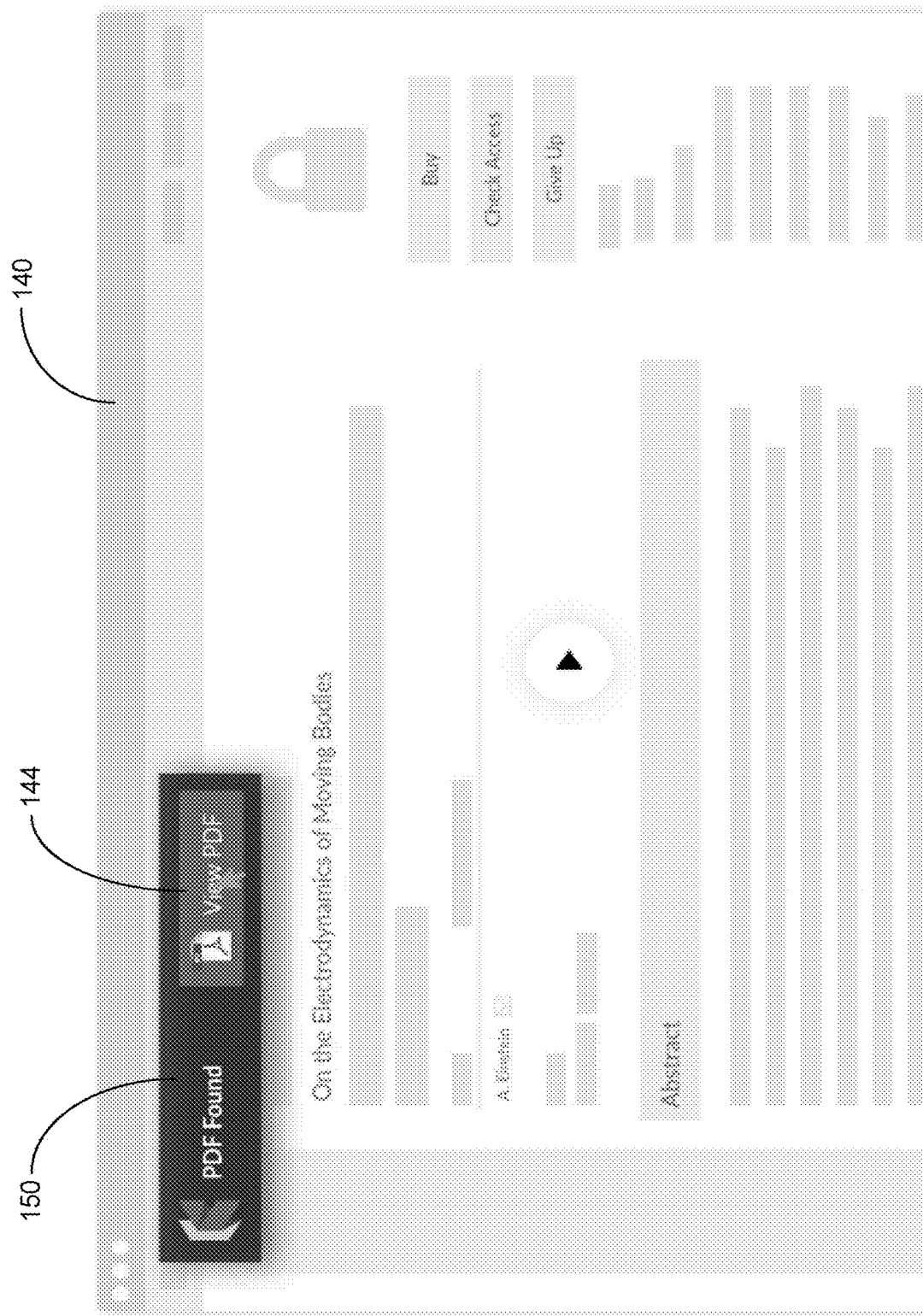
FIG. 3 illustrates an exemplary user interface including a research browser plugin according to one or more aspects of the disclosed subject matter.

Meanwhile, client component 152 may generate and render single action controls 144*a* and 144*b*, representatively referred to herein as single action control(s) 144 or, alternatively, one-click control(s) 144, which may be associated with the smart link to the corresponding document. A single action control (or one-click control) is a component that performs an operation, e.g., retrieving a research article, in response to activation of the control, such as by clicking on an associated graphical element rendered in web browser (a button control, for example) without additional user input. Such single action controls may be realized using conventional interface construction techniques. Generally, the single action control 144 provides single action access to journal articles and other research papers, providing the best available version contextual to the researcher's institutional subscriptions and physical location without the need for any centralized database of subscriptions or holdings. FIG. 3 is an illustration of an example web browser 140 with browser extension 150 and single action control 144.

As search results are gathered, client component 152, with support from the provider services component 121 associates a resource ID (RID), such as a digital object identifier (DOI), with each article link on a page. Once the RID has been determined, client component 152 begins to search, again with support from the provider services component 121, for alternative copies of this RID. If one of these alternatives is deemed superior, then the corresponding one-click control 144 is updated to point to this document. As the search results page loads, it is possible for one-click controls 144 to be updated multiple times.

In certain embodiments, a hierarchy of sources is maintained, such as in document information 125, with preprint servers appearing at the bottom, and journal websites at the top. When a document is requested by the user, the system proceeds to traverse the hierarchy from top to bottom to classify the document from its source. Article recommendations may be generated using an established recommendation strategy (e.g. content based from previously accessed user documents, collaborative based on the behavior of similar users, or some combination thereof). Access rights to each of these sources are determined on the fly by client component 152 running on researcher workstation 710, or alternatively, by having client 152 attempt to make a request to the document in question and then use the response to this request to ascertain if the user has access to this source or not. When presented to the user, article recommendations can then be re-ordered based on whether a user can access these articles and which article version is available (e.g. PJAs ranking higher than pre-prints ranking higher than articles not available at all).

In certain embodiments, components on both enterprise server 120 and researcher workstation 110, will ascertain whether the user in question has already accessed a particular article, or an article from the same journal. If this query is in the affirmative, then the outcome is an extremely good predictor of what the user will be able to obtain for the current query. Certain embodiments also consider what other users with a similar affiliation have been able to obtain should any of them have previously requested this article. This again is an extremely good predictor of the level of access an institution has to a given resource. This prediction enables embodiments of the invention to preempt the result of the full resolution procedure described above and hence display a fully functioning single action or one-click link far earlier than would otherwise be possible.

Data collected by system 100 may include that by which a library tool can calculate "cost per article download"—the standard measure of subscription efficiency adjusted for alternative open versions available. For example, if 50 of 100 PDFs were available by alternative means, subscription fees may be discounted accordingly.

Machine learning, such as by machine learning/models component 124, may be utilized in embodiments of the invention to, for example, dynamically reorder the source hierarchy on a per-article basis. If, for example, there are several (open, non-paywalled) links to a document (e.g., one link to a preprint server and another to an institutional repository, and a third to a personal blog), machine learning/models component 124 of enterprise server 120 will fingerprint these articles in accordance with how close the particular article is to the published (paywalled) article (VoR or PJA). The link corresponding to the fingerprinted article is then boosted to the top of the source hierarchy. Machine learning/models component 124 may perform fingerprinting using resource metadata and semantic analysis of the questioned and published documents.

Machine learning may also be employed to calculate differences in full text between pre-prints/manuscripts and final published versions. Accordingly, existence of any changes can be provided to end users when showing a pre-print version accessed via a smart link described herein.

Figure 2:
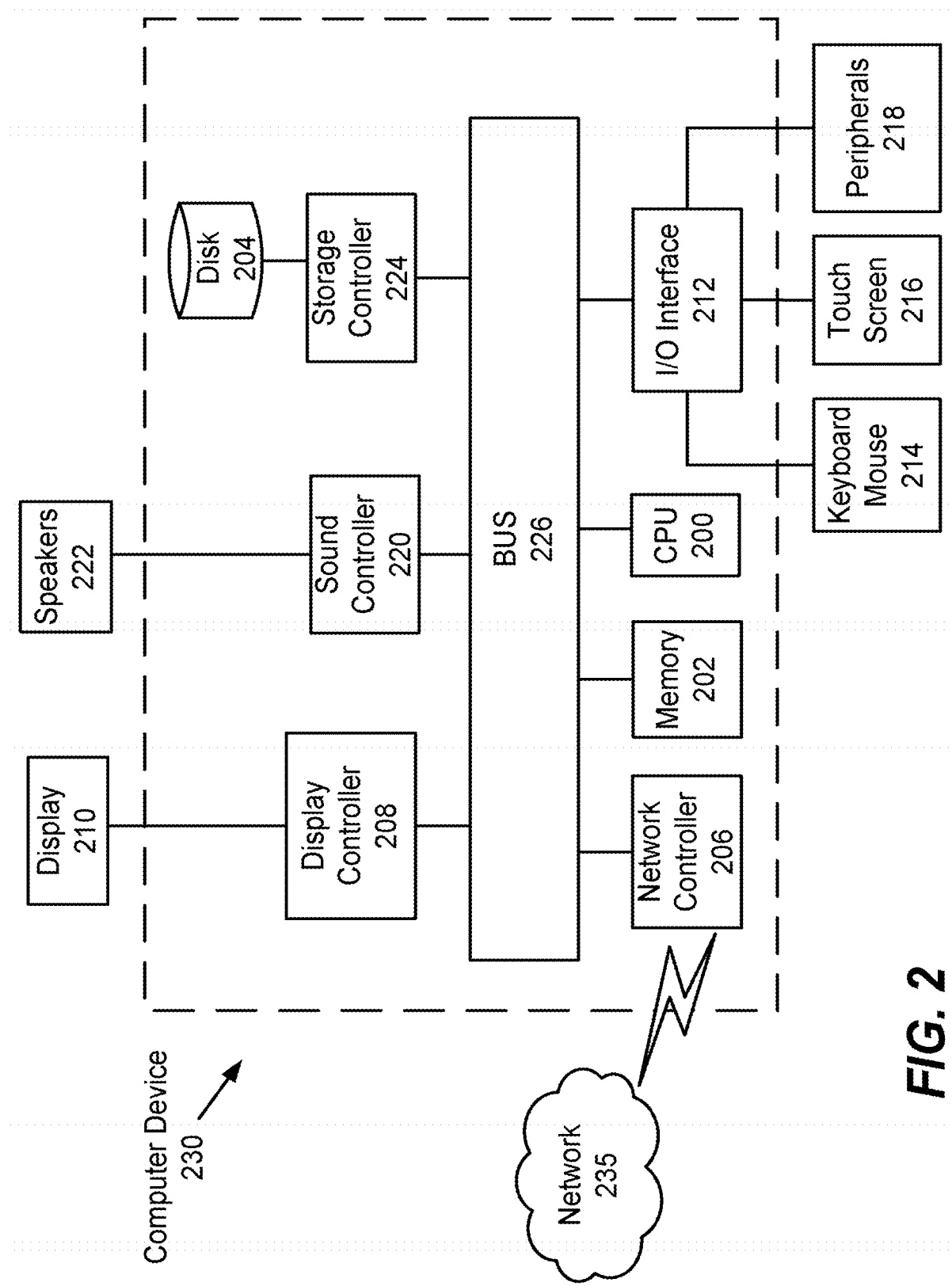
FIG. 2 is a hardware block diagram of a computer device according to one or more exemplary aspects of the disclosed subject matter.

Next, a hardware description of a computer device 230 (such as workstation 110, enterprise server 120 and content servers 130*a*-130*n*) configured to aspects of the present invention is described with reference to FIG. 2. The hardware description described herein can also be a hardware description of the processing circuitry. In FIG. 2, the computer device 230 includes a CPU 200 which performs one or more of the processes described above/below. The process data and instructions may be stored in memory 202. These processes and instructions may also be stored on a storage medium disk 204 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer device 230 communicates, such as a server or computer.

Further, the claimed advancements may be provided as a utility application, background daemon, or component of an operating system, or combination thereof, executing in conjunction with CPU 200 and an operating system such as Microsoft Windows, UNIX, Solaris, LINUX, Apple MAC-OS and other systems known to those skilled in the art.

The hardware elements in order to achieve the computer device 230 may be realized by various circuitry elements. Further, each of the functions of the above described embodiments may be implemented by circuitry, which includes one or more processing circuits. A processing circuit includes a particularly programmed processor, for example, processor (CPU) 200, as shown in FIG. 2. A processing circuit also includes devices such as an application specific integrated circuit (ASIC) and conventional circuit components arranged to perform the recited functions.

In FIG. 2, the computer device 230 includes a CPU 200 which performs the processes described above. The computer device 230 may be a general-purpose computer or a particular, special-purpose machine. In one embodiment, the computer device 230 becomes a particular, special-purpose machine when the processor 200 is programmed to generate and display the one-click control 144 (and in particular, any of the processes discussed with reference to FIGS. 4-15).

Alternatively, or additionally, the CPU 200 may be implemented on an FPGA, ASIC, PLD or using discrete logic circuits, as one of ordinary skill in the art would recognize. Further, CPU 200 may be implemented as multiple processors cooperatively working in parallel to perform the instructions of the inventive processes described above.

The computer device 230 in FIG. 2 also includes a network controller 206, such as an Intel Ethernet PRO network interface card from Intel Corporation of America, for interfacing with network 235. As can be appreciated, the network 235 can be a public network, such as the Internet, or a private network such as an LAN or WAN network, or any combination thereof and can also include PSTN or ISDN sub-networks. The network 235 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer device 230 further includes a display controller 208, such as a graphics card or graphics adaptor for interfacing with display 210, such as a monitor. A general purpose I/O interface 212 interfaces with a keyboard and/or mouse 214 as well as a touch screen panel 216 on or separate from display 210. General purpose I/O interface also connects to a variety of peripherals 218 including printers and scanners.

A sound controller 220 is also provided in the computer device 230 to interface with speakers/microphone 222 thereby providing sounds and/or music.

The general purpose storage controller 224 connects the storage medium disk 204 with communication bus 226, which may be an ISA, EISA, VESA, PCI, or similar, for interconnecting all of the components of the computer device 230. A description of the general features and functionality of the display 210, keyboard and/or mouse 214, as well as the display controller 208, storage controller 224, network controller 206, sound controller 220, and general purpose I/O interface 212 is omitted herein for conciseness as these features are known.

Browser extension 150 may be constructed or otherwise configured to activate on platforms on which browser extension 150 is integrated. Such platforms include scholarly platforms typically used by researchers, such as GOOGLE SCHOLAR and PUBMED, among others. Browser extension 150 contextually constructs and injects smart links to journal articles, for example, which the end user may want to access. Activation of the browser extension 150 may be triggered by one or more of the presence of article identifiers (digital object identifiers (DOIs), PubMed identifiers (PMIDs), etc.) in web pages, a combination of embedded bibliographic metadata, and user interactions with a particular web page (e.g. searching for particular keywords).

In one embodiment, the browser extension 150 provides an immediate link to a preprint version of a document, which then gets replaced by a link to the paywalled version once that link has been established by browser extension 150. In the background, the system searches a configurable hierarchy of article sources in parallel, including the user's history of previously accessed articles, the user's institutional subscriptions, "open"/free content available online (e.g. open access journals, institutional repositories, academic blogs, etc.), and third-party services (e.g. Google Scholar/OA-DOI). The relative importance of each of these article sources is entirely contextually configurable on a per user or per institutions basis, and can consider factors including source authority (e.g. publisher, institutional repository, preprint server, blog etc.), document version (e.g. preferring publisher's version of record over preprints from preprint servers), and end-user experience (e.g. time to first byte for article download—in certain cases, it may be preferable to deliver a preprint more quickly instead of waiting for a VoR, which may involve a noticeable delay).

Once accessed, articles are rendered in web browser 140 along with tools for organizing and finding articles. Copies can also be placed in the user's online locker 126 (i.e., local and/or remote memory) so they can be efficiently re-retrieved without accessing the original source again. It should be appreciated that the above procedure can be applied to journal articles distributed in PDF format, but is readily adaptable to other formats also (e.g. EPUB, HTML, etc.). Additionally, embodiments of the invention can be generalized beyond journal papers to, for example, conference proceedings, books and book chapters.

Additionally, end-users with institutional affiliations can connect browser extension 150 with one or more content subscribers (e.g. their university library) to access paywalled scholarly content using existing institutional subscriptions. Affiliations can be inferred from the user's IP address or provided manually during signup, for example. The invention provides users access to resources on-campus and off-campus through existing authentication/access infrastructure including IP-authentication methods when behind institutional IP ranges, institutional proxies (e.g. EZProxy), federated authentication systems (e.g. Shibboleth/SSO), hosted proxy, and the like.

Where institutional authentication is required, the authentication workflows are exposed on first PDF access. The steps taken by the end-user during authentication are captured within browser extension 150 including institutional credentials which are encrypted and stored in the browser, as indicated at credentials 154, along with any other steps taken by the user (e.g. completion of form elements, interstitial pages, multi-factor authentication, etc.). These steps can be replayed in the future within the user's browser to transparently re-authenticate the user as necessary (e.g. to refresh expired cookie sessions or login to publisher platforms). In certain embodiments, the authentication infrastructure is built to an extensible specification to efficiently allow for many different authentication flows.

Browser extension 150 provides an advantage and a technological improvement by dynamically learning from an institution's holdings. This learning process is seamless and requires no input from the user or their institution. More specifically, as users attempt to access documents, entitlements are inferred using a variety of signals including presence or absence of access markers on web pages (e.g. page metadata or content marking access, HTTP return codes, etc.), requesting scholarly resources (e.g. PDFs), analytics captured from previous resource access attempts, entitlements inferred from other users, and the like. These signals are persisted on the enterprise server 120 where they are used to train a machine learning model of machine learning/models component 124, which can predict if an institution has access to a resource. The same data can also be incorporated into an access-aware journal article recommendation algorithm. This solves a major problem in the field of link services, which is understanding what content a user has access to. This knowledge is vital in order to provide the user with an appropriate content link. The traditional solution is for each institution to make their holdings catalogue available to the service provider. However, even in these cases one-click access experience is not guaranteed. Moreover, these products do not deliver best article version contextual to the user, and since institutions often change their subscriptions, this catalogue must be periodically refreshed. As such, existing solutions require explicit participation from each institution, and present an ongoing maintenance concern.

Additionally, access to most subscribed scholarly resources is determined (usually by the publisher platform or database) by comparing the end user's IP address to a whitelist of subscribing IP ranges maintained by whitelist/blacklist component 122 to provide on-campus access. One advantage of the browser extension 150 is that its infrastructure can automatically proxy user's content access requests which removes the need for a centralized holdings database and eliminates the need for users to alter their browsing behavior. To this end, example enterprise server 120 hosts a proxy service 123 which establishes a permanent connection into the institution's IP range using a virtual private network, a technology which is widely deployed across academic institutions. Browser extension 150 connects to proxy service 123 and authenticates the user against existing institutional authentication infrastructure (e.g., LDAP/Shibboleth). Future requests to scholarly resources are then intercepted at browser extension 150 and then redirected through proxy service 123 into the institutions IP range, thus providing seamless off-campus access to resources.

Figure 4:
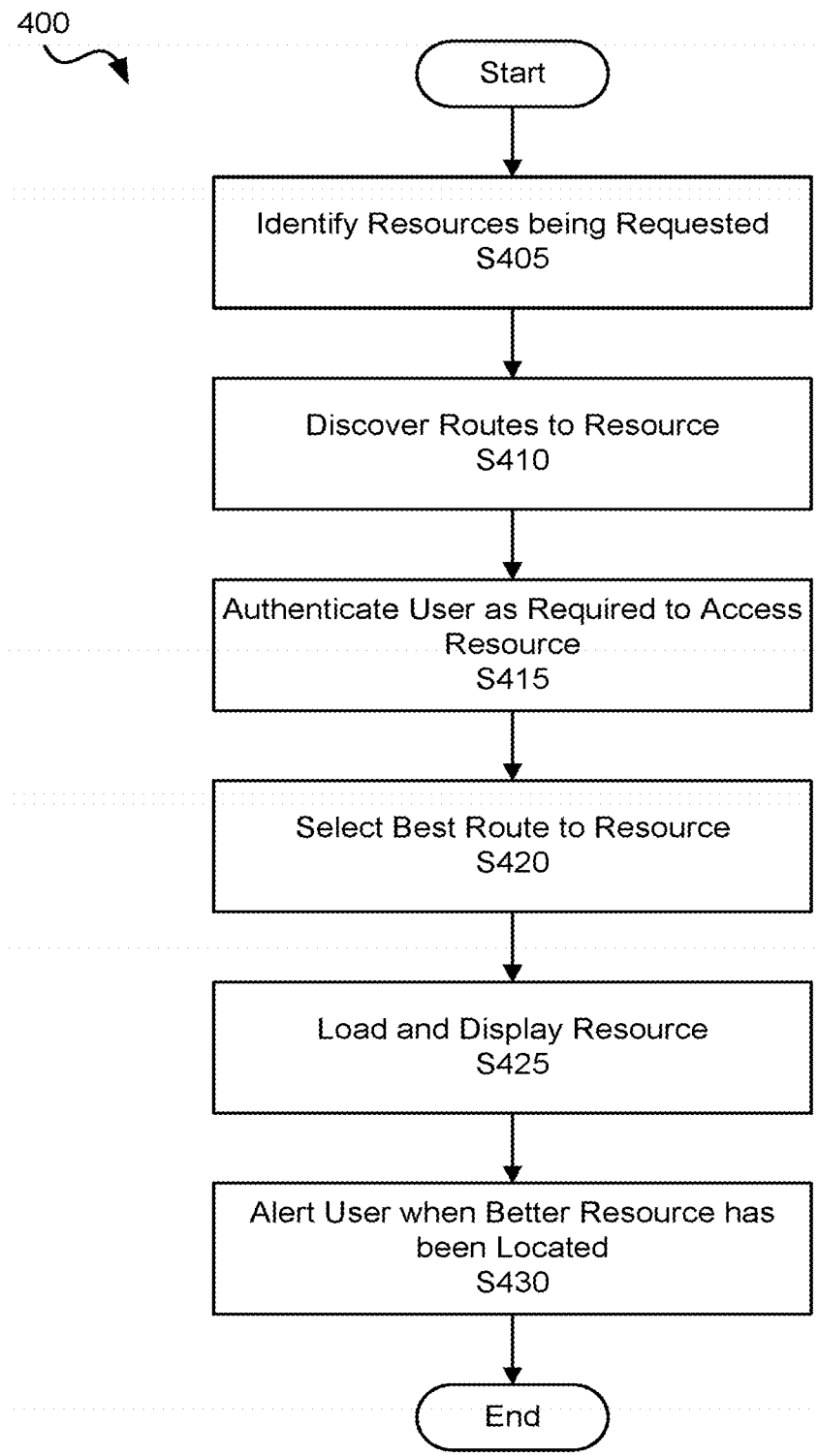
FIG. 4 is a flow chart of an example research process by which the present invention can be embodied.
Figure 5:
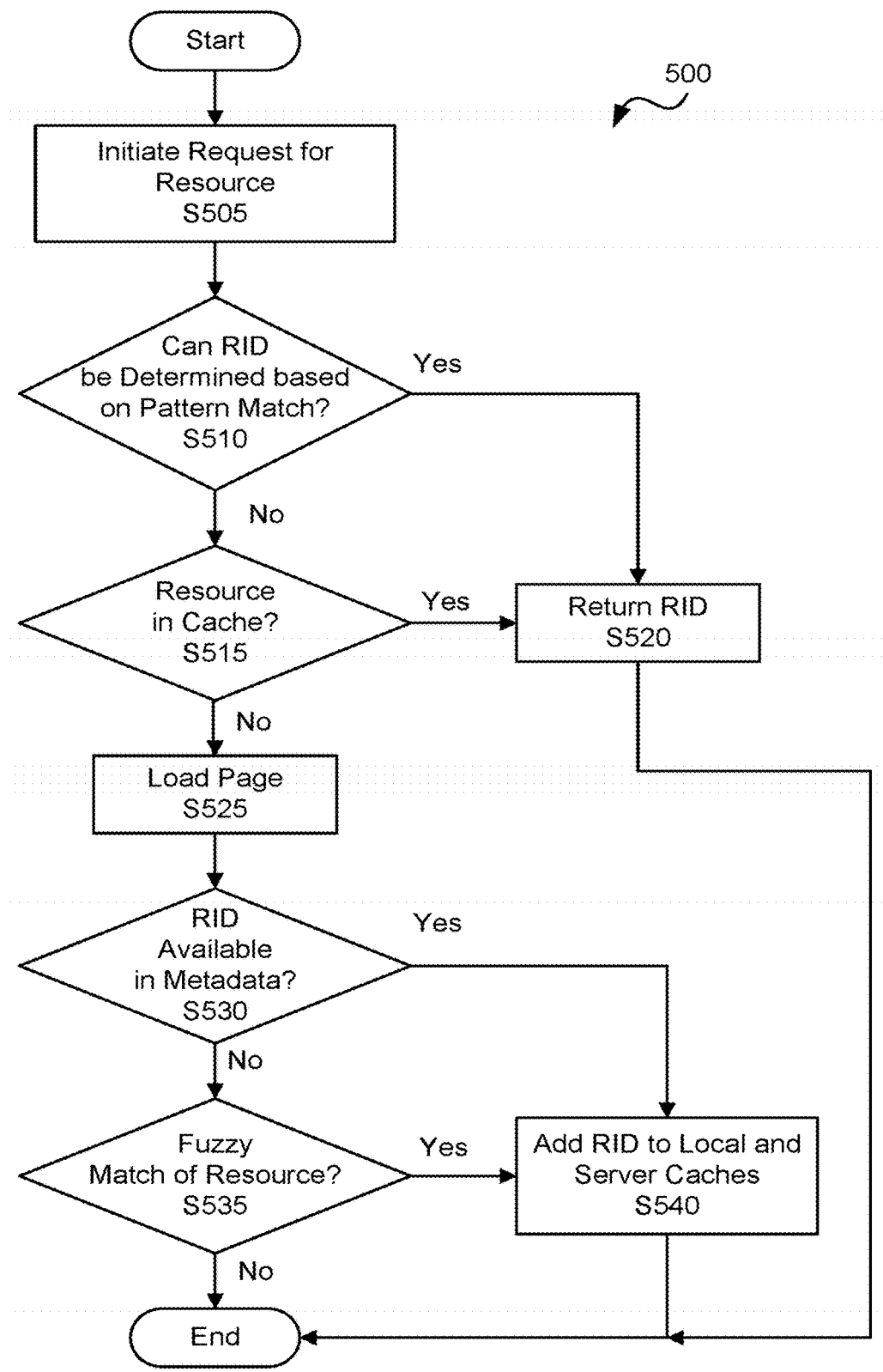
FIG. 5 is a flow chart of an example resource identification process according to one or more aspects of the disclosed subject matter.

FIG. 4 is a flow chart of an example process 400 by which a researcher can perform research through an embodiment of the invention. For example, a researcher may employ the system 100 illustrated in FIG. 1, which may realize process 400. In operation S405, resources being requested are identified. Generally, operation S405 maps user actions to a resource ID (RID), such as digital object identifiers (DOIs) or PubMed identifiers (PMIDs), among others. FIG. 5 is a flow chart of an example process 500 by which such mapping may be realized. In operation S505, a request for a resource may be initiated in response to some user action. Typical examples of such user action include submitting a query to a search engine or following a hyperlink. In operation S510, source and destination platforms are compared to a whitelist of URL patterns and it is determined whether an RID can be determined based on a pattern match. Such a pattern match may be determined from a regular expression comparison against either the URL of the article page being requested or the page contents themselves. If a match exists, process 500 may transition to operation 520, whereby the RID determined from the pattern match is returned to the calling process (process 400). If the RID cannot be determined from a pattern match, process 500 may transition to operation S515, by which it is determined whether the requested resource is cached. If so, the RID associated with the cached resource is returned to the calling process (process 400) in operation S520. If the RID cannot be determined from cached resources, as determined in operation S515, process 500 may transition to operation S525, by which the web page containing the resource, e.g., article abstract page or article full text, is loaded into the web browser. Once loaded, operation S530 may determine whether there is an RID in the web page metadata. If so, the RID is added to local and server caches in operation S540. In such caches, e.g., document cache 127 and/or document cache 158, it is cached that a given URL is associated with a specific RID and the full text PDF associated with the RID is separately cached.

If the RID is not found in the loaded web page, process 500 may transition to operation S535 by which a fuzzy matching on bibliometric metadata or abstract text is attempted to identify the resource from characteristics of the document and characteristics of resources for which the RID is known. If so, process 500 transitions to operation S540 by which the RID is added to local and server caches. Otherwise, process 500 terminates without the resource being identified.

Figure 6:
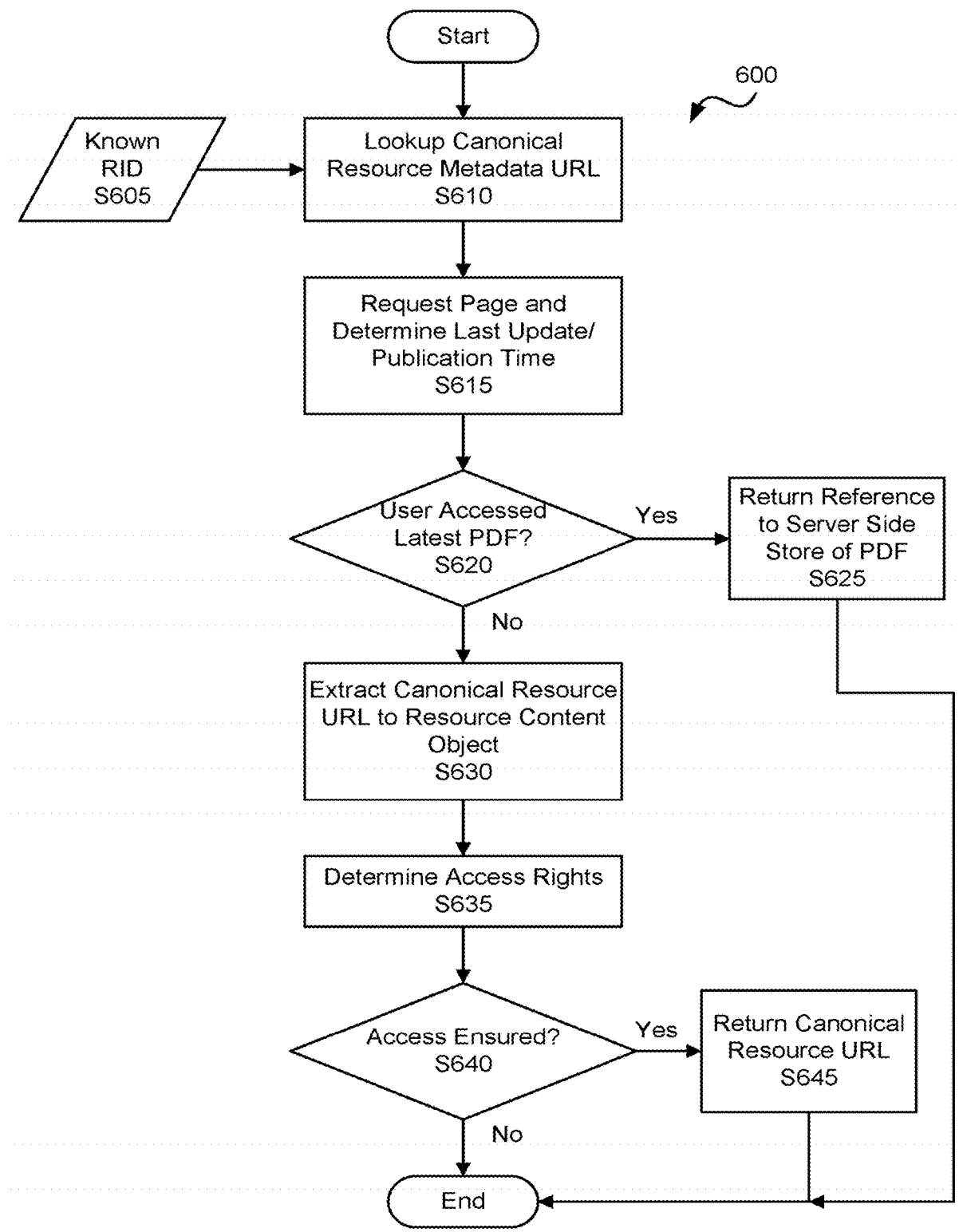
FIG. 6 is a flow chart of an example process by which routes to resources are discovered according to one or more aspects of the disclosed subject matter.

Referring once again to FIG. 4, routes to the resource identified in operation S405 are discovered in operation S410. FIG. 6 is a flow diagram of an example route discovery process 600 that can be realized in embodiments of the present invention. Using a known RID (indicated at S605), such as that identified in operation S405, operation S610 performs a lookup to locate a canonical resource metadata URL. Such canonical resource metadata may be found at the publisher's page for the article, and the URL for that page may be returned in response to the lookup. In operation S615, the page associated with the URL is requested and it is determined therefrom a last update or publication time. In operation S620, it is determined whether the user has accessed the latest resource (PDF) and, if so, a reference to the server side store of the PDF is returned to the calling process (process 400) in operation S625. If the user has not accessed the latest PDF, as determined in operation S620, process 600 may transition to operation S630, by which the canonical resource URL to the resource content object is extracted from the page requested in operation S615. Access rights to the resource determined in operation S635 and, if access to the resource is ensured, as determined in operation S640, the canonical resource URL is returned to the calling process (process 400).

Figure 7:
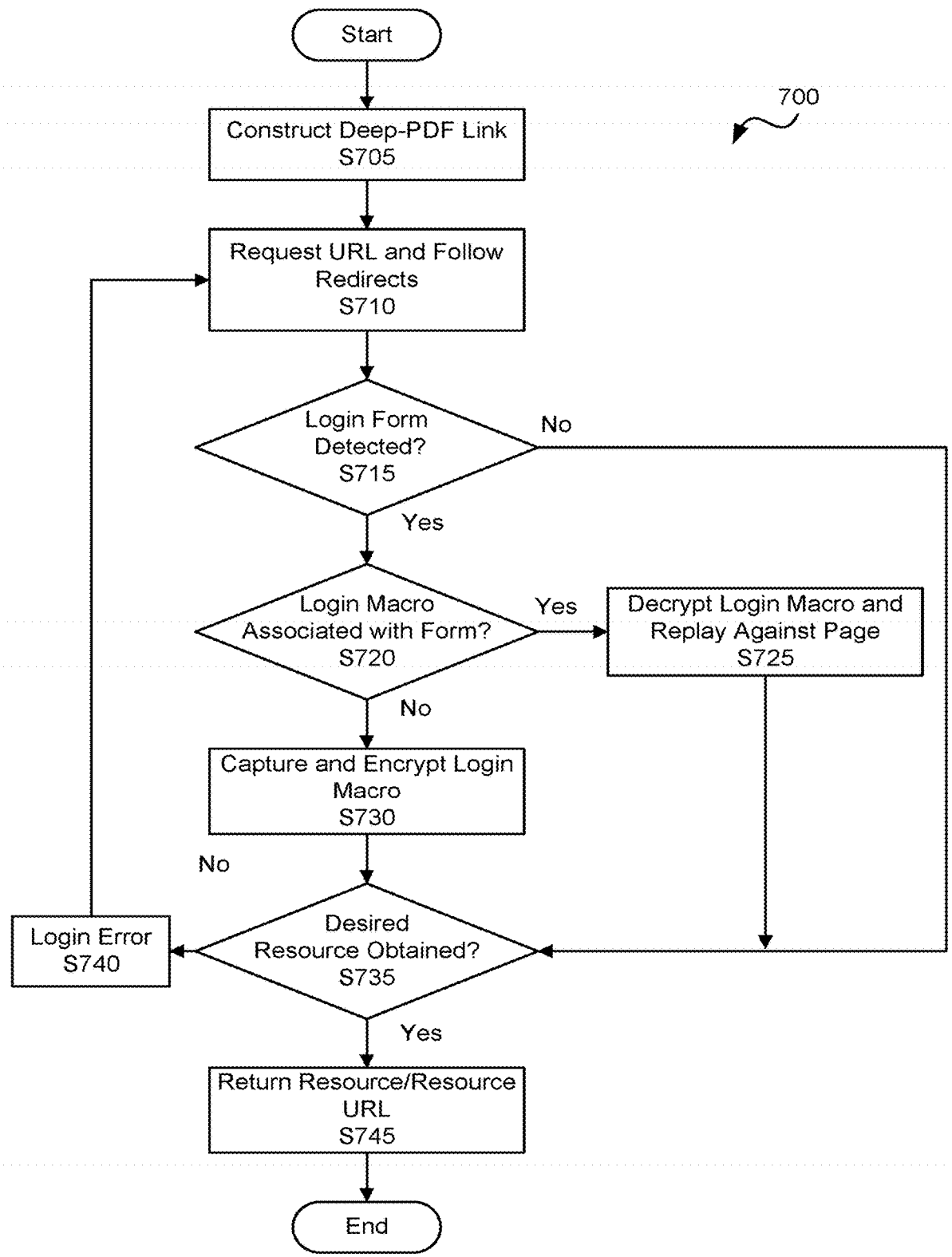
FIG. 7 is a flow chart of an example process by which resources are authenticated according to one or more aspects of the disclosed subject matter.

FIG. 7 is a flow chart of an example resource authentication process 700 that can be used in conjunction with embodiments of the present invention. In operation S705, a smart-link is constructed from either a proxy stub+resource or WAFYless+resource+IDP. In operation S710, the URL defined by the smart-link is requested and any redirects are followed. Process 700 may then transition to operation S715, by which it is determined whether a login form is detected. If so, it is determined in operation S720 whether a login macro is associated with the form. If such macro exists, it is decrypted and replayed against the login page in operation S735. Otherwise, if a login macro is not associated with the login form, as determined in operation S720, one is created in operation S730 by capturing and encrypting the user's input to the login form. In operation S735, it is determined whether the desired resource was obtained and, if not, a login error is reported to the user in operation S740 and process 700 returns to operation S710. If the desired resource was obtained, as determined in operation 735, the resource or the resource URL is returned to the calling process (process 400) in operation S745.

Figure 8:
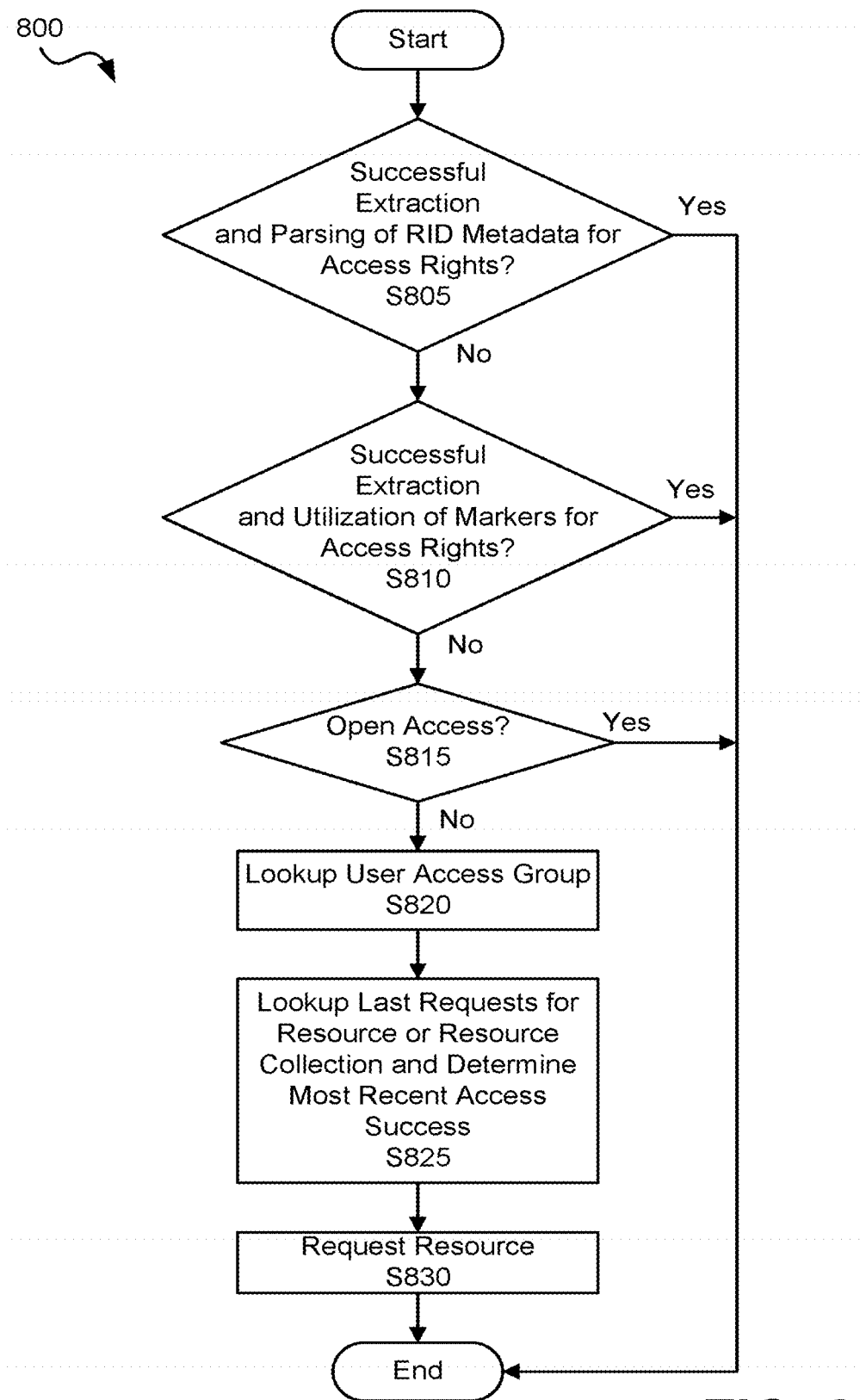
FIG. 8 is a flow chart of an example process by which a user's access rights are determined.

FIG. 8 is a flow chart of an example access rights determination process 800 that can be used in conjunction with embodiments of the invention. In operation S805, it is determined whether the access rights are successfully extracted and parsed from RID metadata and, if so, process 800 may terminate. If there was no success in extracting the access rights from the RID metadata, as determined in operation S805, process 800 may transition to operation S810, whereby it is determined whether the access rights are successfully extracted from markers and, if so, process 800 may again terminate. If there was no success in extracting the access rights from the markers, as determined in operation 810, process 800 may transition to operation S815, it is determined whether the resource has open access rights and, if so, process 800 may terminate. Otherwise, process 800 may transition to operation S820, whereby a user access group lookup is performed. Such a user access group may be an institution or a subdivision thereof. In operation S825, a lookup is performed of last requests for the resource or resource collection to determine the most recent access success. Process 800 may then transition to operation S830, whereby the resource is requested.

Figure 9:
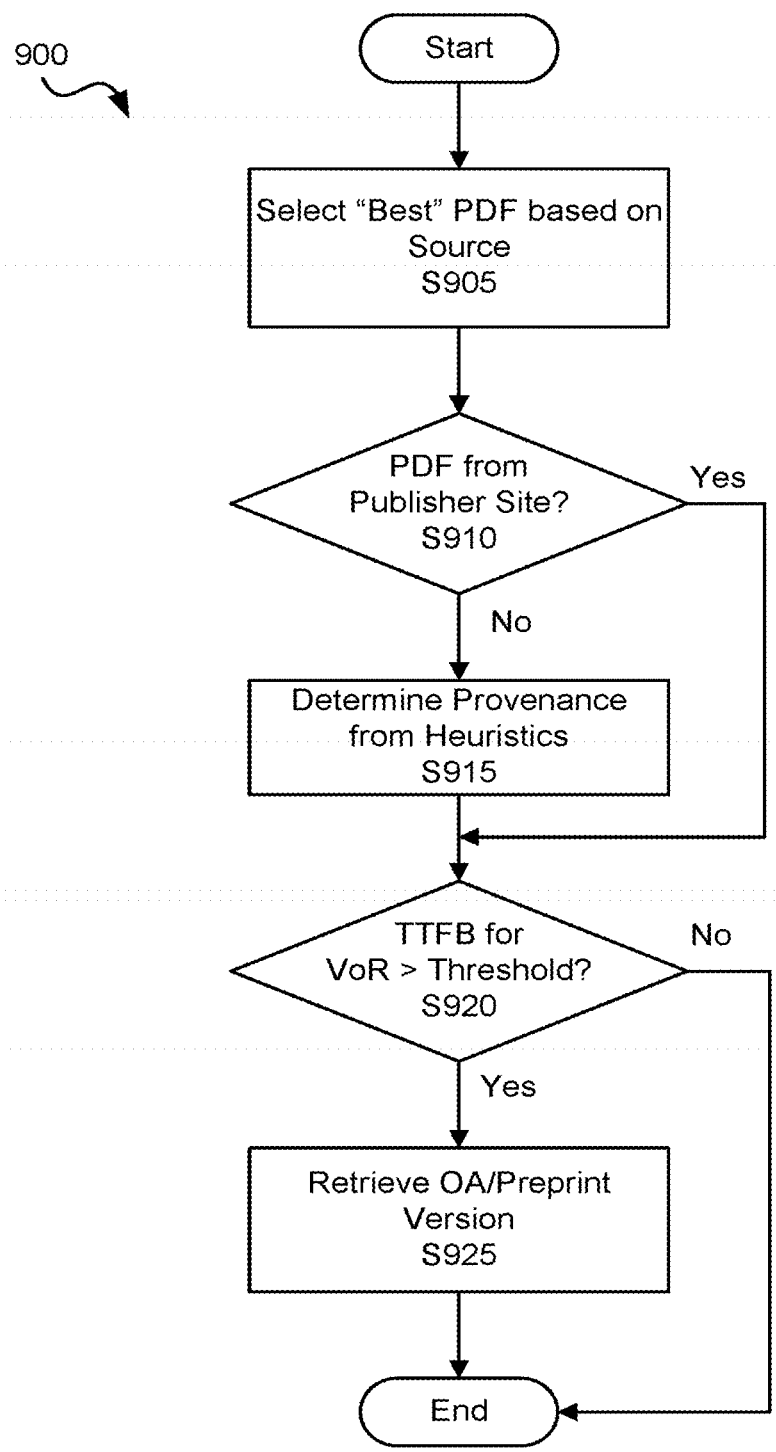
FIG. 9 is a flow chart of an example process by which a "best" document is retrieved according to one or more aspects of the disclosed subject matter.

Returning now to FIG. 4, once it is determined that the user has access to the resource, as established in operation S415, process 400 may transition to operation S420, whereby the best route to the resource is selected. FIG. 9 is a flow chart of an example best route to resource selection process 900 that can be used in conjunction with embodiments of the invention. In operation S905, the best PDF (or other document type) is selected based on its source (e.g., publisher's VoR delivered from the publisher). If the PDF is from a publisher's website, process 900 may transition to operation S920, whereby it is determined whether the VoR from the publisher's site is slow to load, e.g., time to first byte (TTFB) exceeding some threshold. If so, process 900 may transition to operation S925, by which the open access/preprint version of the resource is retrieved. If, however, the PDF is not from the publisher's website, as determined in operation S910, the provenance of the PDF may be determined from heuristics in operation S915, considering PDF XMP metadata, two-column formatting of text, document creation date, etc.

Figure 10:
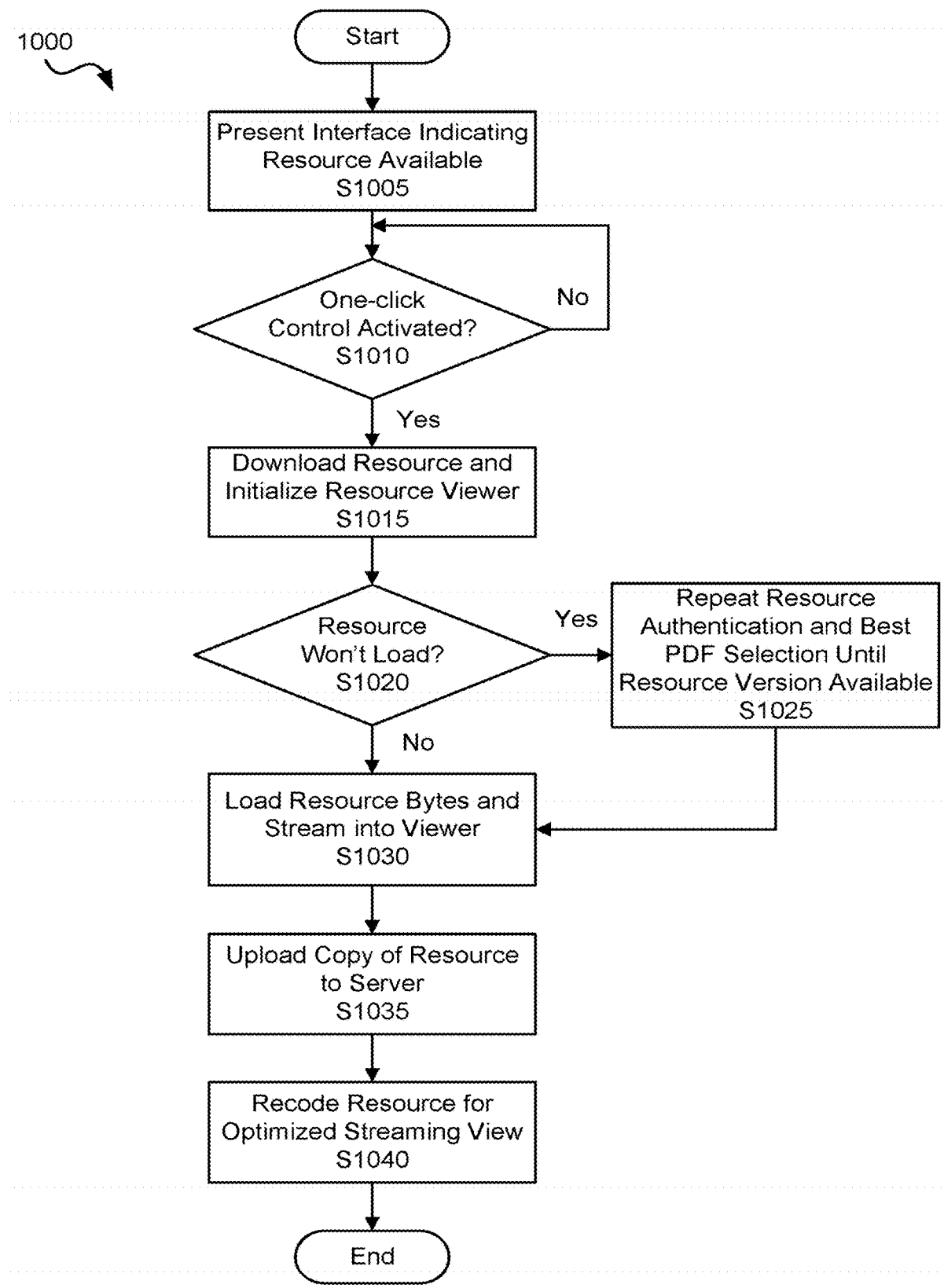
FIG. 10 is a flow chart of an example process by which a "best" document is loaded and rendered according to one or more aspects of the disclosed subject matter.

As illustrated in FIG. 4, once the best route to resource has been selected in operation S420, process 400 may transition to operation S425, whereby the resource is loaded and displayed. FIG. 10 is a flowchart of an example load and display process 1000 that can be used in conjunction with embodiments of the present invention. In operation S1005, an interface is presented that indicates that a resource is available. Such indication may include presentation of a one-click control in association with a representation (e.g., a graphical element or text) of the document. In operation S1010, it is determined whether the one-click control has been activated. If so, process 1000 may transition to operation S1015, whereby the resource is downloaded while the resource viewer is initialized. In operation S1020, it is determined whether the resource will not load and, if so, process 1000 may transition to operation S1025, whereby the operations of resource authentication (process 700) and best PDF selection (process 900) are repeated until a resource version is available. Otherwise, if the resource loads properly, as determined by operation 1020, process 1000 may transition to operation 1030, in which resource bytes are loaded and streamed into the resource viewer. In operation S1035, a copy of the resource is uploaded to the enterprise server and, in operation S1040, the resource may be recoded to optimized streaming view (e.g., linearization of PDF).

As illustrated in FIG. 4, once the resource has been loaded and displayed, process 400 may transition to operation S430, whereby the user is alerted when a better resource has been located.

Figure 11:
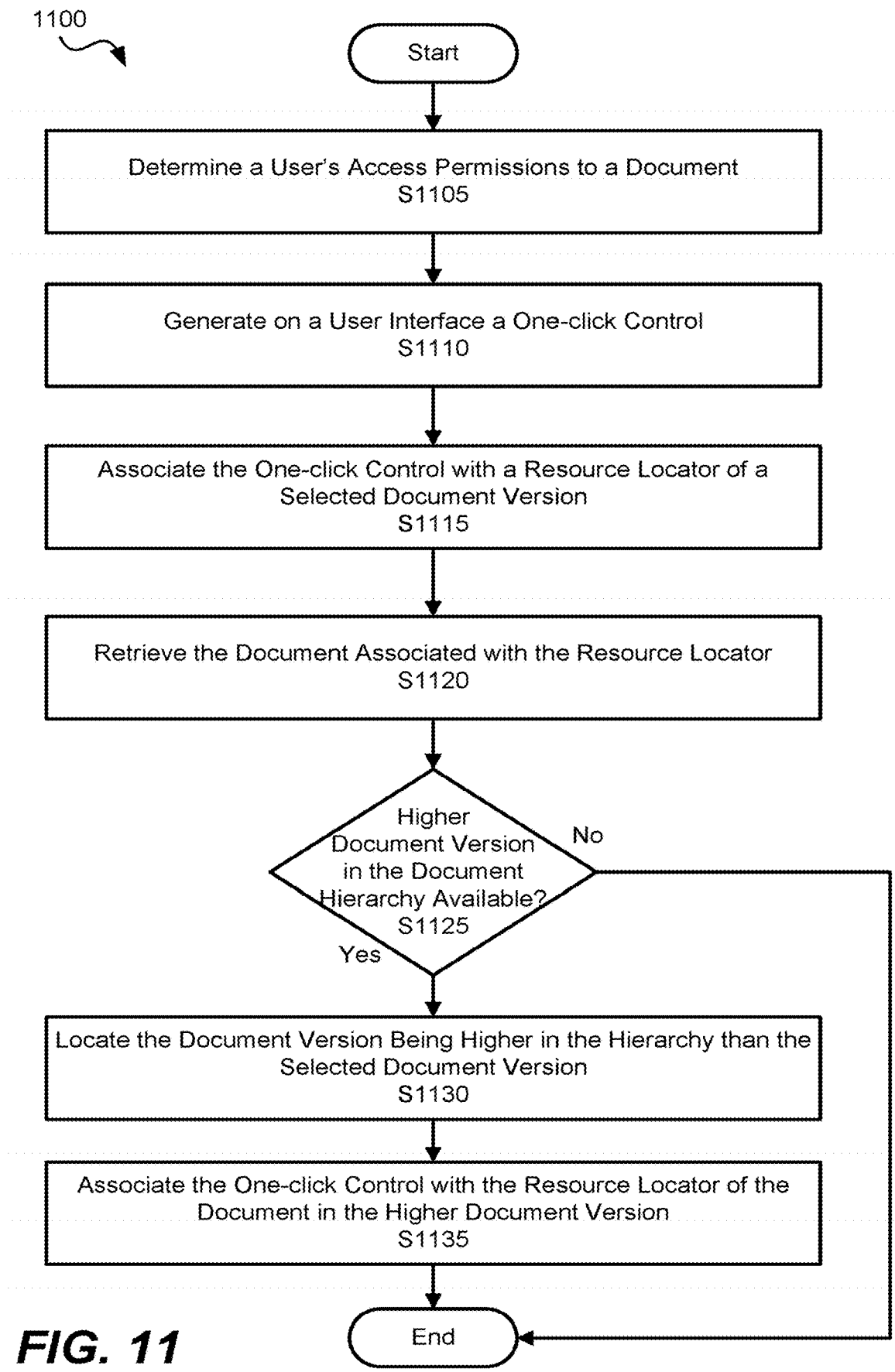
FIG. 11 is a flow chart of a process by which a one-click control is associated with a uniform resource locator according to one or more aspects of the disclosed subject matter.

FIG. 11 is a flow chart of a method for associating one-click control according to one or more aspects of the disclosed subject matter.

In S1105, a user's access permissions to a document can be determined. The document can be stored at network locations in document versions that are categorized by a predetermined hierarchy, for example. Determining a user's access permissions can be based on associating the user with a group of users having identical access permissions, and selecting, as the selected document version, the highest version in the hierarchy that has been accessed by any user within the group of users, for example.

In S1110, a one-click control (e.g., one-click control 144) can be generated on a user interface (e.g., web browser 140).

In S1115, the one-click control can be associated with a resource locator (e.g., URL) of a selected document version. The selected version can be the highest version in the hierarchy to which the user has access permissions, for example. Further, the highest category in the hierarchy for which the document has been located can be selected, as the selected document version, within a predetermined amount of time.

In S1120, the document associated with the resource locator can be retrieved in response to one-click activation of the one-click control 144.

In S1125, it can be determined if a higher version in the document hierarchy is available. If it is determined that there is not a higher version available in the document hierarchy, the process can end. However, if it is determined that a higher version in the document hierarchy is available, the document version being higher in the hierarchy than the selected document version can be located in S1130.

In S1130, subsequent to generating the one-click control 144, the document version being higher in the hierarchy than the selected document version can be located. Alternatively, or additionally, subsequent to retrieving the document, the document can be located in a document version higher in the hierarchy than the selected document version, and it can be indicated through web browser 140 (e.g., via browser extension 150) that a better version of the document has been located.

In S1135, the one-click control 144 can be associated with the resource locator of the document in the higher document version. When the one-click control 144 is associated with the resource locator of the document in the higher document version, the process can end.

Figure 12:
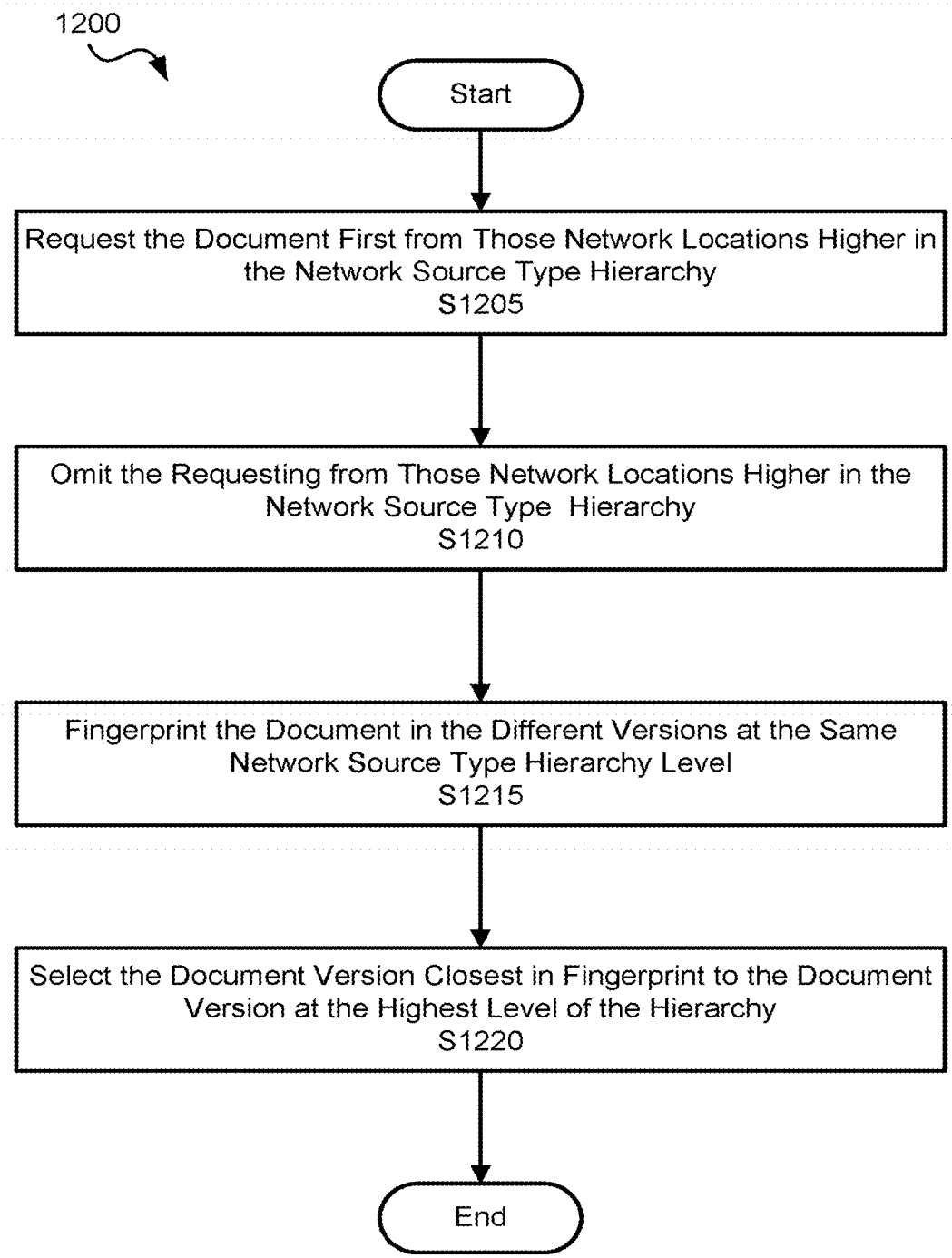
FIG. 12 is a flow chart of a process by which a document is selected according to one or more aspects of the disclosed subject matter.

FIG. 12 is a flow chart of a method for document selection according to one or more aspects of the disclosed subject matter.

In S1205, the document can be requested first from those network locations higher in the network source type hierarchy. Additionally, the hierarchy of document versions can be based on a hierarchy of network source types in which open access network locations at which the document resides is at the lowest level of the hierarchy and in which for-cost network locations at which the document resides are at the highest level of the hierarchy.

In S1210, the requesting from those network locations higher in the network source type hierarchy (e.g., pay-walled site) can be omitted in response to the document being located in the highest document version (e.g., a version of record) at a network location that is lower in the network source type hierarchy (e.g., an open access site).

In S1215, the document can be fingerprinted in the different versions at the same network source type hierarchy level.

In S1220, the document version closest in fingerprint to the document version at the highest level of the hierarchy can be selected as the selected document version. When the document version closest in fingerprint to the document version at the highest level of the hierarchy is selected as the selected document version, the process can end.

Figure 13:
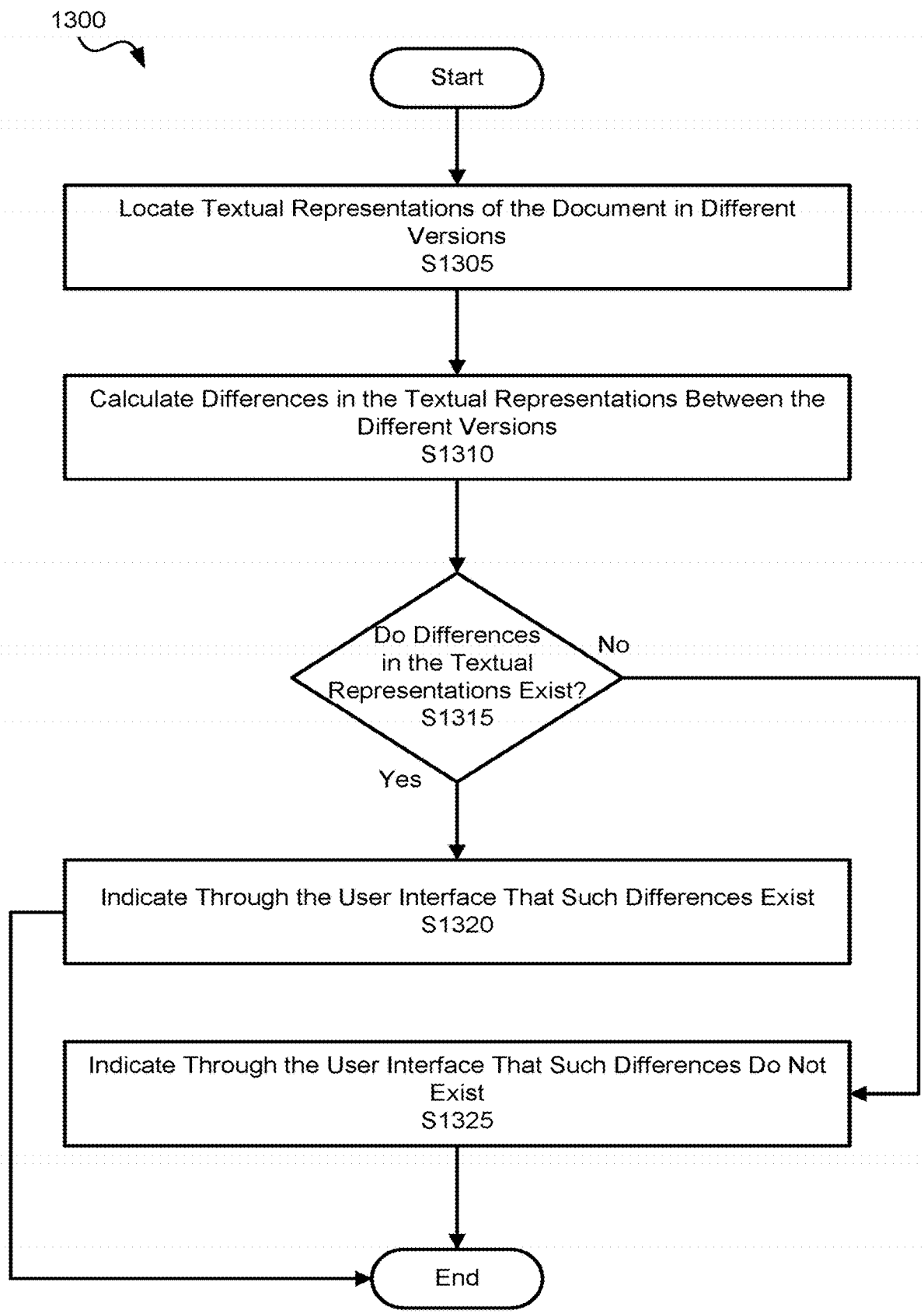
FIG. 13 is a flow chart of a process by which different versions of a document, should such differences exist, are indicated according to one or more aspects of the disclosed subject matter.

FIG. 13 is a flow chart of a method for indicating whether different versions of a document exist according to one or more aspects of the disclosed subject matter.

In S1305, textual representations of the document in different versions can be located.

In S1310, differences in the textual representations between the different versions (e.g., preprint vs. published version of record) can be calculated.

In S1315, it can be determined, based on the calculations in S1310, if differences in the textual representations exist. If it is determined that differences in the textual representations do not exist, it can be indicated through the web browser 140 that such differences do not exist in S1325, and when the web browser 140 indicates that such differences do not exist, the process can end. However, if it is determined that differences in the textual representations do exist, it can be indicated through the web browser 140 that such differences do exist, and when the web browser 140 indicates that such differences do exist, the process can end.

Figure 14:
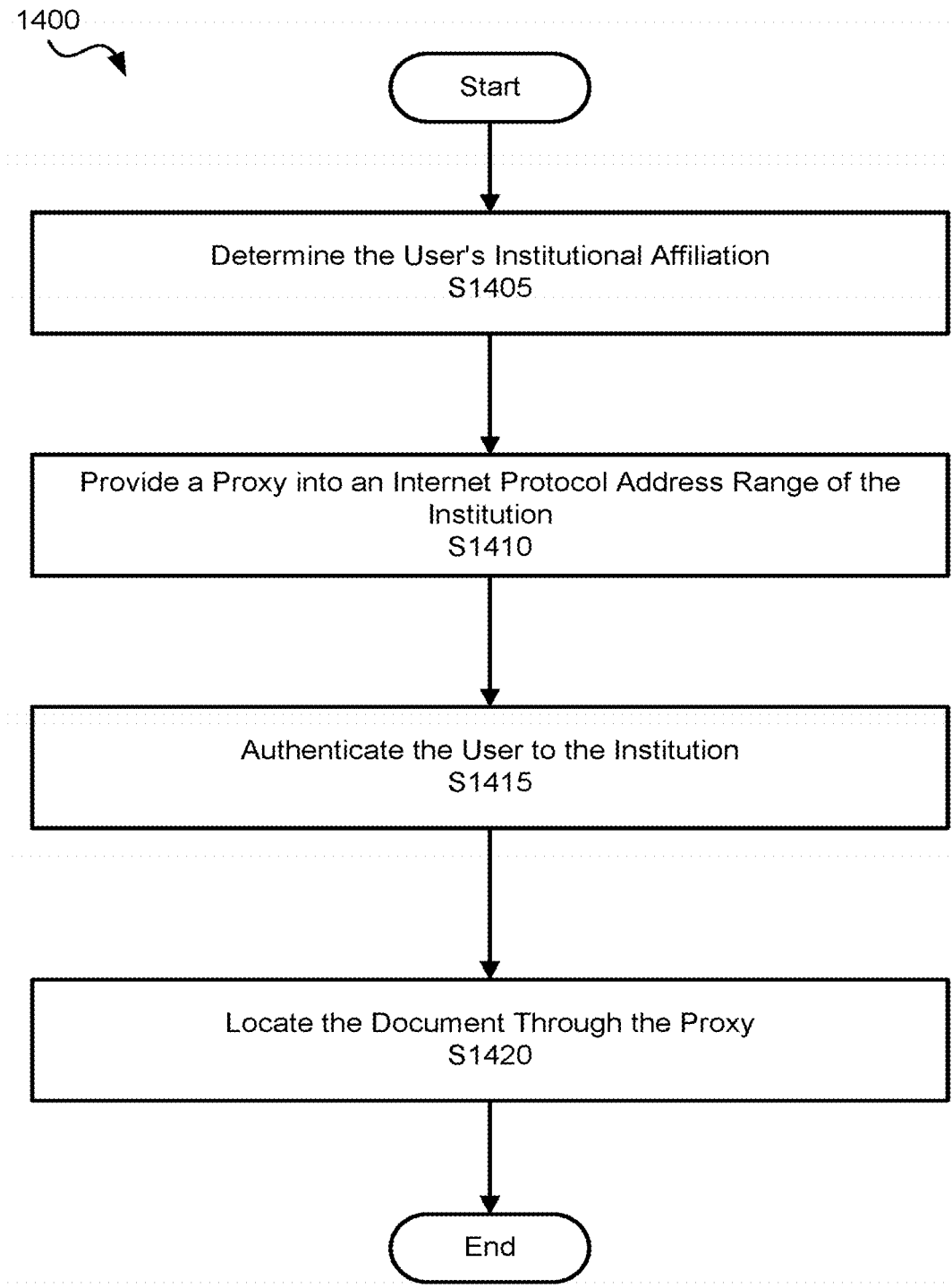
FIG. 14 is a flow chart of a process by which a document is located through institutional affiliation according to one or more aspects of the disclosed subject matter.

FIG. 14 is a flow chart of a method for locating a document through institutional affiliation according to one or more aspects of the disclosed subject matter.

In S1405, the user's institutional affiliation can be determined.

In S1410, a proxy into an internet protocol address range of the institution can be provided.

In S1415, the user can be authenticated to the institution.

In S1420, the document can be located through the proxy. When the document is located through the proxy, the process can end.

Embodiments of the invention provide a technique for transferring an "authentication macro" from one device to another, which allows a user to avoid reauthenticating on a different device (such as when transferring to a mobile device). Client component 152 may encode the user's previously captured encrypted authentication macro in a QR code, which is then displayed on a screen. The end user can then take a picture of the QR code on second device to transfer the authentication macro data. These data are then decoded and subsequently reused without the user having to manually reenter the authentication data on the second device.

Figure 15:
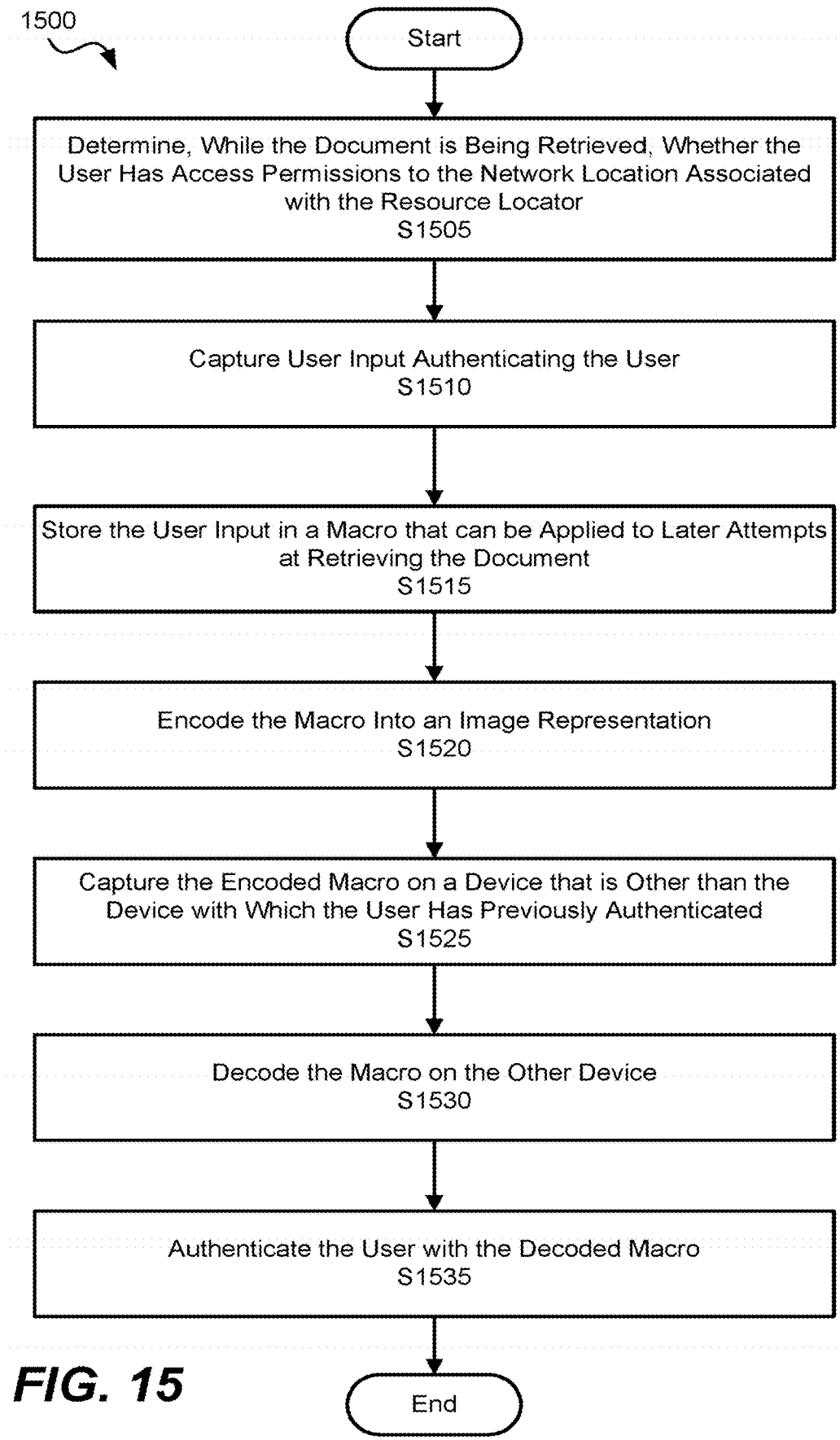
FIG. 15 is a flow chart of a user authentication process according to one or more aspects of the disclosed subject matter.

FIG. 15 is a flow chart of a method for authenticating a user according to one or more aspects of the disclosed subject matter.

In S1505, it can be determined, while the document is being retrieved, whether the user has access permissions to the network location associated with the resource locator.

In S1510, user input authenticating the user can be captured.

In S1515, the user input can be stored in a macro that can be applied to later attempts at retrieving the document.

In S1520, the macro can be encoded into an image representation (e.g., QR code).

In S1525, the encoded macro can be captured on a device other than the device with which the user has previously authenticated.

In S1530, the macro can be decoded on the other device.

In S1535, the user with the decoded macro can be authenticated. When the user with the decoded macro is authenticated, the process can end.

Additionally, the browser extension can be configured to determine cost per article based on subscription costs for the access permissions to the document in light of obtaining different versions at no cost.

Embodiments of the present disclosure may include, without being limited to the following.

An electronic device, comprising: a user interface, the user interface being communicably coupled to processing circuitry configured to operate a research browser plugin, the research browser plugin, via the processing circuitry, being configured to determine a user's access permissions to a document, the document being stored at network locations in document versions that are categorized by a predetermined hierarchy; generate, on the user interface, a single action control and associate the single action control with a resource locator of a selected document version, the selected version being the highest version in the hierarchy to which the user has access permissions; and retrieve the document associated with the resource locator in response to one-click activation of the one-click control.

The electronic device above, wherein the processing circuitry is further configured to subsequent to generating the single action control, locate the document in a document version being higher in the hierarchy than the selected document version; and associate the single action control with the resource locator of the document in the higher document version.

The electronic device above, wherein the hierarchy of document versions is based on a hierarchy of network source types in which open access network locations at which the document resides is at the lowest level of the hierarchy and in which for-cost network locations at which the document resides are at the highest level of the hierarchy, and the processing circuitry is further configured to request the document first from those network locations higher in the network source type hierarchy, omit the requesting from those network locations higher in the network source type hierarchy in response to the document being located in the highest document version at a network location that is lower in the network source type hierarchy, fingerprint the document in the different versions at the same network source type hierarchy level, and select, as the selected document version, the document version closest in fingerprint to the document version at the highest level of the hierarchy.

The electronic device above, wherein the processing circuitry is further configured to subsequent to retrieving the document, locate the document in a document version higher in the hierarchy than the selected document version, and indicate, through the user interface, that a better version of the document has been located.

The electronic device above, wherein the processing circuitry is further configured to determine the user's institutional affiliation, provide a proxy into an internet protocol address range of the institution, authenticate the user to the institution, and locate the document through the proxy.

The electronic device above, wherein the processing circuitry is further configured to determine, while the document is being retrieved, whether the user has access permissions to the network location associated with the resource locator, capture user input authenticating the user, store the user input in a macro that can be applied to later attempts at retrieving the document, encode the macro into an image representation, capture the encoded macro on a device that is other than the device with which the user has previously authenticated, decode the macro on the other device, and authenticate the user with the decoded macro.

A machine implemented method comprising: determining a user's access permissions to a document, the document being stored at network locations in document versions that are categorized by a predetermined hierarchy; generating, on a user interface, a single action control and associating the single action control with a resource locator of a selected document version, the selected version being the highest version in the hierarchy to which the user has access permissions; and retrieving the document associated with the resource locator in response to single action activation of the single action control.

The method above, further comprising: selecting, as the selected document version, the highest category in the hierarchy for which the document has been located within a predetermined time period.

The method above, further comprising: subsequent to generating the single action control, locating the document in a document version being higher in the hierarchy than the selected document version; and associating the single action control with the resource locator of the document in the higher document version.

The method above, wherein the hierarchy of document versions is based on a hierarchy of network source types in which open access network locations at which the document resides is at the lowest level of the hierarchy and in which for-cost network locations at which the document resides are at the highest level of the hierarchy, and the method further comprises: requesting the document first from those network locations higher in the network source type hierarchy.

The method above, further comprising: omitting the requesting from those network locations higher in the network source type hierarchy in response to the document being located in the highest document version at a network location that is lower in the network source type hierarchy.

The method above, further comprising: fingerprinting the document in the different versions at the same network source type hierarchy level; and selecting, as the selected document version, the document version closest in fingerprint to the document version at the highest level of the hierarchy.

The method above, further comprising: locating textual representations of the document in different versions; calculating differences in the textual representations between the different versions; and indicating through the user interface that such differences exist or that such differences do not exist.

The method above, further comprising: determining cost per article based on subscription costs for the access permissions to the document in light of obtaining different versions at no cost.

The method above, further comprising: subsequent to retrieving the document, locating the document in a document version higher in the hierarchy than the selected document version; and indicating, through the user interface, that a better version of the document has been located.

The method above, further comprising: associating the user with a group of users having identical access permissions; and selecting, as the selected document version, the highest version in the hierarchy that has been accessed by any user within the group of users.

The method above, further comprising: determining the user's institutional affiliation; providing a proxy into an internet protocol address range of the institution; authenticating the user to the institution; and locating the document through the proxy.

The method above, further comprising: determining, while the document is being retrieved, whether the user has access permissions to the network location associated with the resource locator; capturing user input authenticating the user; and storing the user input in a macro that can be applied to later attempts at retrieving the document.

The method above, further comprising: encoding the macro into an image representation; capturing the encoded macro on a device that is other than the device with which the user has previously authenticated; decoding the macro on the other device; and authenticating the user with the decoded macro.

A non-transitory computer-readable storage medium storing computer-readable instructions thereon which, when executed by a computer, cause the computer to perform a method, the method comprising: determining a user's access permissions to a document, the document being stored at network locations in document versions that are categorized by a predetermined hierarchy; generating, on a user interface, a single action control and associating the single action control with a resource locator of a selected document version, the selected version being the highest version in the hierarchy to which the user has access permissions; and retrieving the document associated with the resource locator in response to single action activation of the single action control.

In one embodiment, a server is communicably coupled via a network to an electronic device operating a browser plugin, the server comprising: processing circuitry configured to: determine a user's access permission to a document, the document being stored at network locations in document versions that are categorized by a predetermined hierarchy; selecting a document version of the document being the highest version in the hierarchy to which the user has access permission; constructing a resource locator to the document in the selected document version such activation of a single action control implemented by the browser plugin and associated with the resource locator retrieves the document in the selected document version; and transmit, via the network to the electronic device, the constructed resource locator.

In another embodiment, a server is communicably coupled via a network to an electronic device operating a browser plugin, the server comprising: processing circuitry configured to: determine a user's access permission to a document, the document being stored at network locations in document versions that are categorized by a predetermined hierarchy; selecting a document version of the document being the highest version in the hierarchy to which the user has access permission; constructing a resource locator to the document in the selected document version such activation of a single action control implemented by the browser plugin and associated with the resource locator retrieves the document in the selected document version; and transmit, via the network to the electronic device, the constructed resource locator.

In the above descriptions, any processes, descriptions or blocks in flowcharts can be understood as representing modules, segments or portions of code which include one or more executable instructions for implementing specific logical functions or steps in the process, and alternate implementations are included within the scope of the exemplary embodiments of the present advancements in which functions, or portions of functions, can be combined and/or executed out of order from that shown or discussed, including substantially concurrently or in reverse order, depending upon the functionality involved, as would be understood by those skilled in the art. The various elements, features, and processes described herein may be used independently of one another, or may be combined in various ways. All possible combinations and sub-combinations are intended to fall within the scope of this disclosure.

The exemplary circuit elements described in the context of the present disclosure may be replaced with other elements and structured differently than the examples provided herein. Moreover, circuitry configured to perform features described herein may be implemented in multiple circuit units (e.g., chips), or the features may be combined in circuitry on a single chipset.

The functions and features described herein may also be executed by various distributed components of a system. For example, one or more processors may execute these system functions, wherein the processors are distributed across multiple components communicating in a network. The distributed components may include one or more client and server machines, which may share processing, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

Having now described embodiments of the disclosed subject matter, it should be apparent to those skilled in the art that the foregoing is merely illustrative and not limiting, having been presented by way of example only. Thus, although particular configurations have been discussed herein, other configurations can also be employed. Numerous modifications and other embodiments (e.g., combinations, rearrangements, etc.) are enabled by the present disclosure and are within the scope of one of ordinary skill in the art and are contemplated as falling within the scope of the disclosed subject matter and any equivalents thereto. Features of the disclosed embodiments can be combined, rearranged, omitted, etc., within the scope of the invention to produce additional embodiments. Furthermore, certain features may sometimes be used to advantage without a corresponding use of other features. Accordingly, Applicant(s) intend(s) to embrace all such alternatives, modifications, equivalents, and variations that are within the spirit and scope of the disclosed subject matter.

The invention claimed is:

1. An electronic device, comprising:
a user interface, the user interface being communicably coupled to processing circuitry configured to operate a research browser plugin, the research browser plugin, via the processing circuitry, being configured to:
determine a user's access permissions to a document, the document being stored at network locations in document versions that are categorized by a predetermined hierarchy;
generate, on the user interface, a single action control and associate the single action control with a resource locator of a selected document version, the selected version being the highest version in the hierarchy to which the user has access permissions; and
retrieve the document associated with the resource locator in response to single action activation of the single action control, wherein the processing circuitry is further configured to:
subsequently to generating the single action control, locate a document in a document version being higher in the hierarchy than the selected document version; and
associate the single action control with a resource locator of the document in the higher document version.

2. The electronic device of claim 1, wherein the hierarchy of document versions is based on a hierarchy of network source types in which free network locations of the document at which the document resides is at the lowest level of the hierarchy and in which no-free network locations at which the document resides are at the highest level of the hierarchy, and the processing circuitry is further configured to:
request the document first from those network locations higher in the network source type hierarchy,
omit the requested document from those network locations higher in the network source type hierarchy in response to the document being located in the highest document version at a network location that is lower in the network source type hierarchy,
fingerprint the document in the different versions at the same network source type hierarchy level, and
select, as the selected document version, the document version closest in fingerprint to the document version at the highest level of the hierarchy.

3. The electronic device of claim 1, wherein the processing circuitry is further configured to:
subsequent to retrieving the document, locate the document in a document version higher in the hierarchy than the selected document version, and
indicate, through the user interface, that a better version of the document has been located.

4. The electronic device of claim 1, wherein the processing circuitry is further configured to:
determine the user's institutional affiliation,
provide a proxy into an internet protocol address range of the institution,
authenticate the user to the institution, and
locate the document through the proxy.

5. The electronic device of claim 1, wherein the processing circuitry is further configured to:
determine, while the document is being retrieved, whether the user has access permissions to the network location associated with the resource locator,
capture user input authenticating the user,
store the user input in a macro that is applied to later attempts at retrieving the document,
encode the macro into a QR code,
capture the encoded macro on a device that is other than the device with which the user has previously authenticated,
decode the macro on the other device, and
authenticate the user with the decoded macro.

6. A machine implemented method comprising:
determining a user's access permissions to a document, the document being stored at network locations in document versions that are categorized by a predetermined hierarchy;
generating, on a user interface, a single action control and associating the single action control with a resource locator of a selected document version, the selected version being the highest version in the hierarchy to which the user has access permissions; and
retrieving the document associated with the resource locator in response to single action activation of the single action control;
subsequent to generating the single action control, locating a document in a document version being higher in the hierarchy than the selected document version; and
associating the single action control with a resource locator of the document in the higher document version.

7. The method of claim 6, further comprising:
selecting, as the selected document version, the highest category in the hierarchy for which the document has been located within a predetermined time period.

8. The method of claim 6, wherein the hierarchy of document versions is based on a hierarchy of network source types in which free network locations of the document at which the document resides is at the lowest level of the hierarchy and in which no-free network locations at which the document resides are at the highest level of the hierarchy, and the method further comprises:
- requesting the document first from those network locations higher in the network source type hierarchy.

9. The method of claim 8, further comprising:
- omitting the requesting from those network locations higher in the network source type hierarchy in response to the document being located in the highest document version at a network location that is lower in the network source type hierarchy.

10. The method of claim 8, further comprising:
- fingerprinting the document in the different versions at the same network source type hierarchy level; and
- selecting, as the selected document version, the document version closest in fingerprint to the document version at the highest level of the hierarchy.

11. The method of claim 6, further comprising:
- locating textual representations of the document in different versions;
- calculating differences in the textual representations between the different versions, via machine learning; and
- indicating through the user interface that such differences exist or that such differences do not exist.

12. The method of claim 6, further comprising:
- determining cost per article based on subscription costs for the access permissions to the document in light of obtaining different versions at no cost.

13. The method of claim 6, further comprising:
- subsequent to retrieving the document, locating the document in a document version higher in the hierarchy than the selected document version; and
- indicating, through the user interface, that a better version of the document has been located.

14. The method of claim 6, further comprising:
- associating the user with a group of users having identical access permissions; and
- selecting, as the selected document version, the highest version in the hierarchy that has been accessed by any user within the group of users.

15. The method of claim 6, further comprising:
- determining the user's institutional affiliation;
- providing a proxy into an internet protocol address range of the institution;
- authenticating the user to the institution; and
- locating the document through the proxy.

16. The method of claim 6, further comprising:
- determining, while the document is being retrieved, whether the user has access permissions to the network location associated with the resource locator;
- capturing user input authenticating the user; and
- storing the user input in a macro that is applied to later attempts at retrieving the document.

17. The method of claim 16, further comprising:
- encoding the macro into a QR code;
- capturing the encoded macro on a device that is other than the device with which the user has previously authenticated;
- decoding the macro on the other device; and
- authenticating the user with the decoded macro.

18. A non-transitory computer-readable storage medium storing computer-readable instructions thereon which, when executed by a computer, cause the computer to perform a method, the method comprising:
- determining a user's access permissions to a document, the document being stored at network locations in document versions that are categorized by a predetermined hierarchy;
- generating, on a user interface, a single action control and associating the single action control with a resource locator of a selected document version, the selected version being the highest version in the hierarchy to which the user has access permissions; and
- retrieving the document associated with the resource locator in response to single action activation of the single action control,
- subsequently to generating the single action control, locating a document in a document version being higher in the hierarchy than the selected document version; and
- associating the single action control with a resource locator of the document in the higher document version.

* * * * *